(12) United States Patent
Sase et al.

(10) Patent No.: US 8,724,348 B2
(45) Date of Patent: May 13, 2014

(54) POWER-SUPPLY UNIT, HARD-DISK DRIVE, AND SWITCHING METHOD OF THE POWER-SUPPLY UNIT

(75) Inventors: Takashi Sase, Hitachi (JP); Akihiko Kanouda, Hitachinaka (JP); Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 12/869,176

(22) Filed: Aug. 26, 2010

(65) Prior Publication Data

US 2011/0194206 A1 Aug. 11, 2011

(30) Foreign Application Priority Data

Feb. 10, 2010 (JP) ................................. 2010-027352

(51) Int. Cl.
*H02M 3/335* (2006.01)
(52) U.S. Cl.
USPC ......... 363/21.06; 363/21.02; 363/17; 363/24; 363/25; 363/97; 363/131; 363/132
(58) Field of Classification Search
USPC ............. 363/17, 21.02, 21.06, 24, 25, 97, 98, 363/131, 132
See application file for complete search history.

(56) References Cited

U.S. PATENT DOCUMENTS

| 7,158,392 | B2 | 1/2007 | Hosokawa et al. | |
|---|---|---|---|---|
| 8,014,173 | B2 * | 9/2011 | Xu et al. | 363/17 |
| 8,199,530 | B2 * | 6/2012 | Sase et al. | 363/17 |
| 2004/0136209 | A1 | 7/2004 | Hosokawa et al. | |
| 2010/0026095 | A1 * | 2/2010 | Phadke | 307/31 |
| 2010/0097826 | A1 * | 4/2010 | Xu et al. | 363/17 |
| 2010/0232180 | A1 * | 9/2010 | Sase et al. | 363/17 |
| 2011/0103112 | A1 * | 5/2011 | Jiang et al. | 363/125 |

FOREIGN PATENT DOCUMENTS

| JP | 2002-066739 A | 3/2002 |
|---|---|---|
| JP | 2004-215469 A | 7/2004 |
| JP | 2004-260928 A | 9/2004 |
| JP | 2005-318757 A | 11/2005 |

OTHER PUBLICATIONS

U.S. Appl. No. 12/544,135, Sase et al, Pending U.S. Patent Application.

* cited by examiner

*Primary Examiner* — Bao Q Vu
(74) *Attorney, Agent, or Firm* — Crowell & Moring LLP

(57) ABSTRACT

A power-supply unit including a transformer, a full bridge circuit having four arm switches on a primary side of the transformer, a rectifier and smoothing circuit including two synchronous rectifier switches on a secondary side of the transformer, a choke coil, and a capacitor, an output terminal in the rectifier and smoothing circuit, a control circuit controlling ON/OFF of the four arm switches of the full bridge circuit and the two synchronous rectifier switches of the rectifier and smoothing circuit, a resonant inductor including a leakage inductor component and a parasitic inductor component on the primary side of the transformer, and a resonant capacitor, and in which the control circuit includes a timing variable unit which varies switching timings of the two synchronous rectifier switches of the rectifier and smoothing circuit based on an output current flowing in the output terminal provided in the rectifier and smoothing circuit.

16 Claims, 14 Drawing Sheets

POWER-SUPPLY UNIT, HARD-DISK DRIVE, AND SWITCHING METHOD OF THE POWER-SUPPLY UNIT

CROSS REFERENCE TO RELATED APPLICATIONS

This application claims the foreign priority benefit under Title 35, United States Code, §119(a)-(d) of Japanese Patent Application No. 2010-027352, filed on Feb. 10, 2010, the contents of which are hereby incorporated by reference.

BACKGROUND OF THE INVENTION

1. Field of the Invention

The present invention relates to a power-supply unit of a DC-DC converter and, in particular, concerns to efficiency improvement of an isolation type DC-DC converter under a light load thereof.

2. Description of Related Art

A power-supply unit of a DC-DC converter is required to have high efficiency of power conversion in a wide load range from energy saving/energy conservation point of view. Therefore, a power-supply unit having a full bridge circuit at the primary side and a current doubler type rectifier and smoothing circuit at the secondary side is used to attain the high efficiency of power conversion with a soft-switching technology which achieves ZVS (Zero Voltage Switching, hereinafter referred to as ZVS) using a resonant inductor Lr and a resonant capacitor Cr of the full bridge circuit. However, to achieve the ZVS becomes difficult under a light load using this type of power-supply unit, and the efficiency of power conversion decreases. As a method for solving the forgoing problems, Japanese Patent Laid-Open Publication No. 2004-260928 and Japanese Patent Laid-Open Publication No. 2002-66739 have been known. Both the applications describe a method for achieving the ZVS by increasing a value of the resonant inductor under a light load.

In the Japanese Patent Laid-Open Publication No. 2004-260928, a second resonant inductor and a parallel circuit of a switch are provided in series with the resonant inductor Lr for detecting a load-state, and if the load is a light load, the switch is turned off to increase the value of the resonant inductor step by step to achieve the ZVS. However, in the method, a circuit component is added to a power block of the power-supply unit, thereby the circuit becomes complex.

In addition, in the Japanese Patent Laid-Open Publication No. 2002-66739, a saturable reactor is used for increasing the value of the resonant inductor continuously, and the value of the resonant inductor is continuously varied by linearly controlling the saturable reactor based on the load-state. In this case, a circuit for the linear control is added as well as the circuit component is added to the power block of the power-supply unit. Then, the circuit becomes more complex, and a drive loss (energy loss) due to the linear control is generated even under a light load.

It is, therefore, an object of the present invention to solve the forgoing problems, and to provide a power-supply unit of an isolation type DC-DC converter which has high efficiency of power conversion even under a light load.

SUMMARY OF THE INVENTION

In order to solve the problems and achieve the purposes of the present invention, the power-supply unit of the present invention is configured as follows.

Namely, the power-supply unit comprises a transformer, a full bridge circuit consisting of four arm switches provided on a primary side of the transformer, a rectifier and smoothing circuit including two synchronous rectifier switches provided on a secondary side of the transformer, a choke coil, and a capacitor, an output terminal provided in the rectifier and smoothing circuit, a control circuit controlling ON/OFF of the four arm switches of the full bridge circuit and the two synchronous rectifier switches of the rectifier and smoothing circuit, a resonant inductor consisting of a leakage inductor component of the transformer and a parasitic inductor component of wirings on the primary side of the transformer, and a resonant capacitor consisting of a parasitic capacitor component of the arm switches of the full bridge circuit, and in which the control circuit comprises timing variable means which varies switching timings of the two synchronous rectifier switches of the rectifier and smoothing circuit based on an output current flowing in the output terminal provided in the rectifier and smoothing circuit.

According to the configuration described above, ON/OFF of the arm switches provided in the full bridge circuit and the two synchronous rectifier switches of the rectifier and smoothing circuit are controlled under a light load so that a resonant peak voltage required for achieving the ZVS, which is determined by the output current flowing in the output terminal, the resonant inductor, and the resonant capacitor, is operated under the condition as if the output current is increased. Then, energy accumulated in the choke coil of the rectifier and smoothing circuit is returned to the full bridge circuit, and a current flowing in the full bridge circuit increases. As a result, the ZVS of the arm switches which are provided in the full bridge circuit can be ensured.

As described above, according the present invention, there is provided a power-supply unit of an isolation-type DC-DC converter which has high efficiency of power conversion even under a light load.

DETAILED DESCRIPTION OF THE PREFERRED EMBODIMENT

Figure 1:
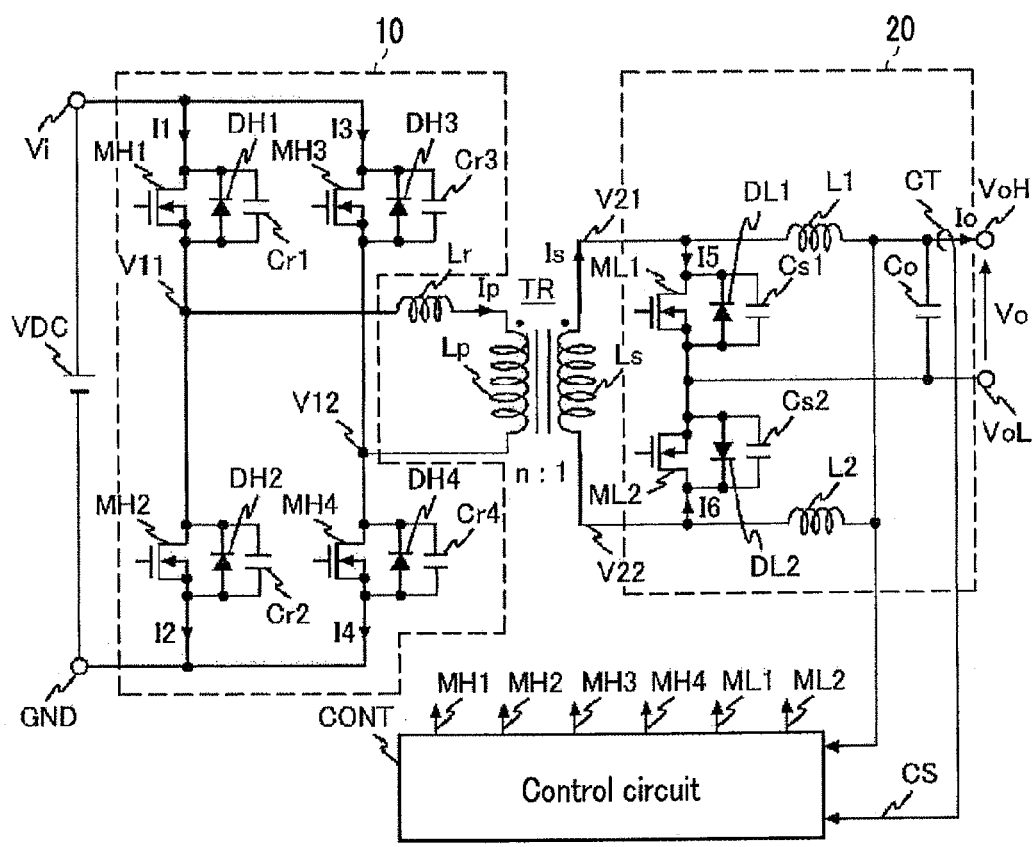
FIG. 1 is a circuit diagram showing a configuration of a power-supply unit according to a first embodiment of the present invention.

First, a summary of an embodiment of the present invention will be explained briefly, then, the embodiment and operations according to the embodiment will be explained in detail.

(Summary of the Embodiment)

A power-supply unit of the present invention is the one that uses an isolation type DC-DC converter, and includes a transformer, a full bridge circuit provided with four arm switches on the primary side of the transformer, a rectifier and smoothing circuit provided with two synchronous rectifier switches and a choke coil as well as a capacitor on the secondary side of the transformer, and a control circuit which controls ON/OFF (ON and OFF) of the four arm switches and the two synchronous rectifier switches and has a timing variable means for varying a switching timing of the two synchronous rectifier switches.

By controlling ON/OFF of the four arm switches of the full bridge circuit, DC voltage is converted to AC voltage, and the AC voltage is applied to the primary side of the transformer and transmitted to the secondary side of the transformer. On the secondary side, the transmitted power is re-converted to DC voltage using the rectifier and smoothing circuit provided with the two synchronous rectifier switches and the choke coil as well as the capacitor by controlling ON/OFF of the two synchronous rectifier switches.

In addition, a load-state of output power on the secondary side of the transformer effects on the full bridge circuit on the primary side of the transformer through the transformer, and the full bridge circuit operates receiving this effect. In this case, it is important that ON/OFF switching of the four arm switches is conducted under the condition that a voltage between both ends of respective switches is close to 0 (zero) in order to reduce an energy loss and improve efficiency of power conversion. Therefore, a zero voltage switching (ZVS) of the arm switches is required.

When the load is a light load, switching timings of the two synchronous rectifier switches are shifted from a trailing edge to a leading edge side of OFF periods of the top and bottom arm switches on the lag phase side of the full bridge circuit consisting of the four arm switches, that is, the switching timings are shifted from a rise timing of an arm switch switching from OFF to ON to a fall timing of an arm switch switching from ON to OFF of the top and bottom arm switches on the lag phase side of the full bridge circuit. Then, in a synchronous rectifier switch switching from ON to OFF of the two synchronous rectifier switches, a current of the choke coil flowing toward the synchronous rectifier switch is switched to a direction toward a body diode. The current of the choke coil may be considered as a constant current in a fine period. Therefore, if a coil current on the secondary side of the transformer is added to the choke coil, a current flowing in the body diode decreases by an amount of increase in the coil current on the secondary side.

In addition, if the coil current on the secondary side becomes identical to a constant current value of the choke coil, current flow stops in the body diode. Then, the body diode becomes non-conductive to be cut-off. If the coil current on the secondary side further increases, the coil current exceeds the constant current value of the choke coil. Therefore, an amount of current exceeding the constant current value of the choke coil of the coil current on the secondary side flows into a parasitic capacitor of the synchronous rectifier switch as an surplus current, while charging the parasitic capacitor. Then, a both end voltage of the synchronous rectifier switch, namely, one end voltage of the secondary coil of the transformer is rapidly increased to a voltage which is a sum of an output voltage of the power-supply unit and a voltage generated in the choke coil. Due to this rapid increase in voltage, the coil current on the secondary side of the transformer is suppressed, and the surplus current flowing in the parasitic capacitor of the synchronous rectifier switch decreases, finally, to be zero. As a result, the coil current on the secondary side converges at the constant current value flowing in the choke coil to be equal to the value.

As described above, the energy accumulated in the choke coil connected to the synchronous rectifier switch which switches from ON to OFF flows into the secondary coil of the transformer, that is, the energy is transmitted to the primary side of the transformer. Therefore, since a current on the primary side of the transformer can be increased, a decrease in a resonant peak voltage, which is required to achieve the ZVS (Zero Voltage Switching) which is determined by a resonant inductor, a resonant capacitor and a load dependent current under a light load, is recovered to a predetermined value for achieving the ZVS.

In addition, in the power-supply unit of the present invention, an amount of increase in current is varied depending on a load-state. The amount of increase in current is increased as the load becomes lighter. Switching timings of the two synchronous rectifier switches are shifted by the timing variable means provided in the control circuit. Namely, as the load becomes lighter, the switching timings of the two synchronous rectifier switches are shifted more from the trailing edge to the leading edge side of OFF periods of the top and bottom arm switches on the lag phase side of the full bridge circuit, that is, the switching timings are shifted more from a rise timing of the arm switch switching from OFF to ON to a fall timing of the arm switch switching from ON to OFF of the top and bottom arm switches on the lag phase side of the full bridge circuit. As a result, the efficiency of power conversion can be improved in a wide load range.

That is the summary of the embodiment, and the details will be described below.

(First Embodiment)

Hereinafter, a power-supply unit according to the first embodiment of the present invention will be explained in reference to FIG. 1 to FIG. 12.

In addition, an embodiment of a switching method of the power-supply unit of the present invention will be explained.

FIG. 1 is a circuit diagram showing the first embodiment of a power-supply unit of an isolation type DC-DC converter to which the present invention is applied.

In FIG. 1, a reference TR is a transformer, and a reference 10 shown with a dotted line is a full bridge circuit which AC-drives a primary coil Lp of the transformer TR. A reference 20 shown with a dotted line is a current doubler type (full-wave type) rectifier and smoothing circuit which converts AC voltage induced in the primary coil Ls of the transformer TR to DC voltage through synchronous conversion. A reference CONT is a control circuit which controls operation timings of arm switches MH1 to MH4 constituting the full bridge circuit 10 and consisting of MOSFETs, and synchronous rectifier switches ML1, ML2 consisting of MOSFETs of the current doubler type rectifier and smoothing circuit. Meanwhile, MOSFET means a Metal-Oxide-Semiconductor Field-Effect Transistor, and the MOSFET is the abbreviation thereof. In addition, since MOSFET has a switching function, MOSFET may be simply written as a switch in some case when MOSFET is used as a switch (for example, MOSFET MH1 is written as switch MH1).

The full bridge circuit 10 includes N-channel type MOSFETs MH1, MH2 and N-channel type MOSFETs MH3, MH4, which are connected in series between an input terminal Vi to which a DC voltage VDC is applied and a reference potential (ground) GND on the primary side. Meanwhile, diodes DH1 to DH4 and resonant capacitors Cr1 to Cr4 which are connected in parallel with the MOSFETs MH1 to MH4 are body diodes and parasitic electrostatic capacities, respectively, inherent to respective MOSFETs MH1 to MH4.

It is noted that the N-channel type MOSFETs MH1 to MH4 correspond to the top and bottom arm switches described in the (SUMMARY OF THE EMBODIMENT).

A connection point (correspond to V11) of the N-channel type MOSFETs MH1, MH2 constituting the full bridge circuit and a connection point (correspond to V12) of the N-channel type MOSFETs MH3, MH4 constituting also the full bridge circuit are connected to the primary side of the transformer TR, and a voltage generated in the full bridge circuit is applied to the primary coil Lp of the transformer TR. The applied voltage is transmitted to both ends (correspond to V21 and V22) of the secondary coil Ls and output. Meanwhile, a turn ratio of the primary coil Lp to the secondary coil Ls of the transformer TR is n:1.

The synchronous rectifier switches ML1, ML2, which are connected in series, of the current doubler type rectifier and smoothing circuit 20 are connected to both ends (correspond to between V21 and V22) of the secondary coil Ls of the transformer TR. One end of a choke coil L1 is connected to one terminal (correspond to V21) of the secondary coil Ls, and one end of a choke coil L2 is connected to the other end (correspond to V22) of the secondary coil Ls. The other end of the choke coil L1 is connected to the other end of the choke coil L2. An output capacitor Co is connected between the other end of the choke coil L1 and the connection point of the synchronous rectifier switches ML1 and ML2. In addition, output terminals VoH and VoL, to which a load (not shown) is connected, are connected to respective ends of the output capacitor Co. The other end of the choke coil L1 is connected to the output terminal VoH of the current doubler type rectifier and smoothing circuit 20, and the connection point of the synchronous rectifier switches ML1 and ML2 is connected to the other output terminal VoL of the current doubler type rectifier and smoothing circuit 20. A current transformer CT is provided in a connection line between the other end of the choke coil L1 and the output terminal VoH for detecting a current Io flowing in the connection line.

Meanwhile, the output terminal VoL may be grounded.

In addition, a diode DL1 and a diode DL2, and a capacitor Cs1 and a capacitor Cs2, which are connected in parallel with the synchronous rectifier switch MOSFET ML1 and the synchronous rectifier switch MOSFET ML2, respectively, are body diodes and electrostatic capacities (parasitic electrostatic capacity) inherent to the synchronous rectifier switch MOSFET ML1 and the synchronous rectifier switch MOSFET ML2, respectively.

In addition, the current doubler type rectifier and smoothing circuit 20 consisting of the synchronous rectifier switches ML1, ML2, the choke coils L1, L2, and the output capacitor Co rectifies the full wave, and thereby the circuit 20 is called as a current doubler type rectifier and smoothing circuit.

A sense current CS detected by the current transformer CT and an output voltage Vo between the output terminal VoH and the output terminal VoL are input to the control circuit CONT. In addition, the control circuit CONT generates a control timing of a controlling signal of each of the MOSFETs MH1 to MH4 that are arm switches using a phase shift PWM (Pulse Width Modulation) control system, and a timing of ON/OFF of the controlling signal of each of the MOSFETs ML1, ML2 that are synchronous rectifier switches, based on a signal from a phase shift PWM of each of the MOSFETs MH1 to MH4 that are arm switches. Specifically, the timing is the one that corresponds to each of the controlling signals (for MH1 to MH4, ML1 and ML2) shown in FIG. 2 to FIG. 4.

In addition, the control circuit CONT includes a timing variable means that is capable of varying a switching timing of each of the synchronous rectifier switches ML1, ML2 depending on a load current quantity.

(Operations of Power-Supply Unit of Isolation Type DC-DC Converter)

Next, operations of a power-supply unit of an isolation type DC-DC converter according to the embodiment will be explained by referring to timing charts of FIG. 2 to FIG. 5 and equivalent circuits of FIG. 6 to FIG. 11. It is noted that FIG. 6 to FIG. 11 show states of respective equivalent circuits of the full bridge circuit 10 and the current doubler type rectifier and smoothing circuit 20 in each of the periods #1 to #6 shown in FIG. 2 to FIG. 5.

Figure 2:
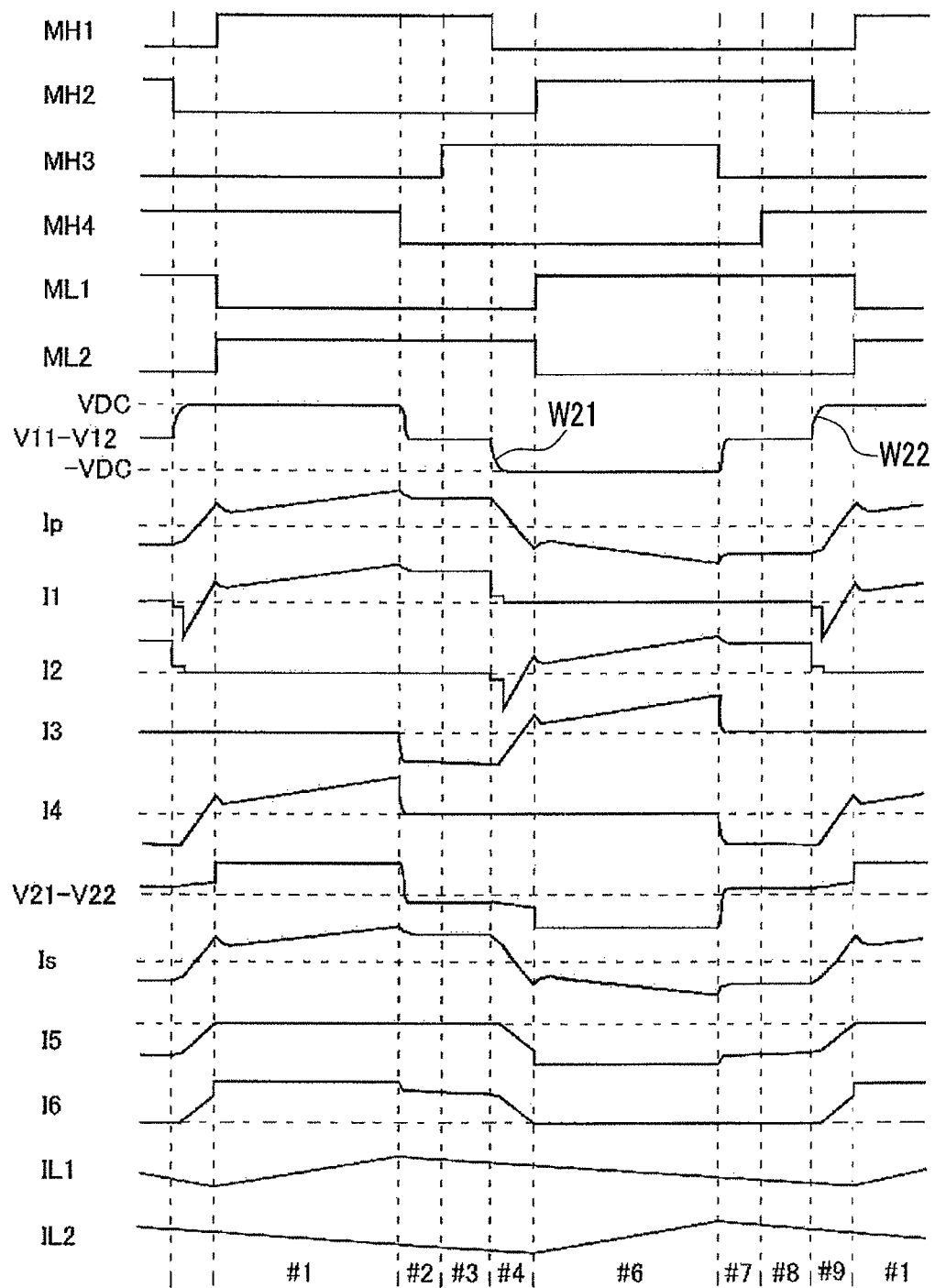
FIG. 2 is a timing chart showing operations of respective parts of a circuit under a rated load (and its vicinity) of the power-supply unit shown in FIG. 1.
Figure 3:
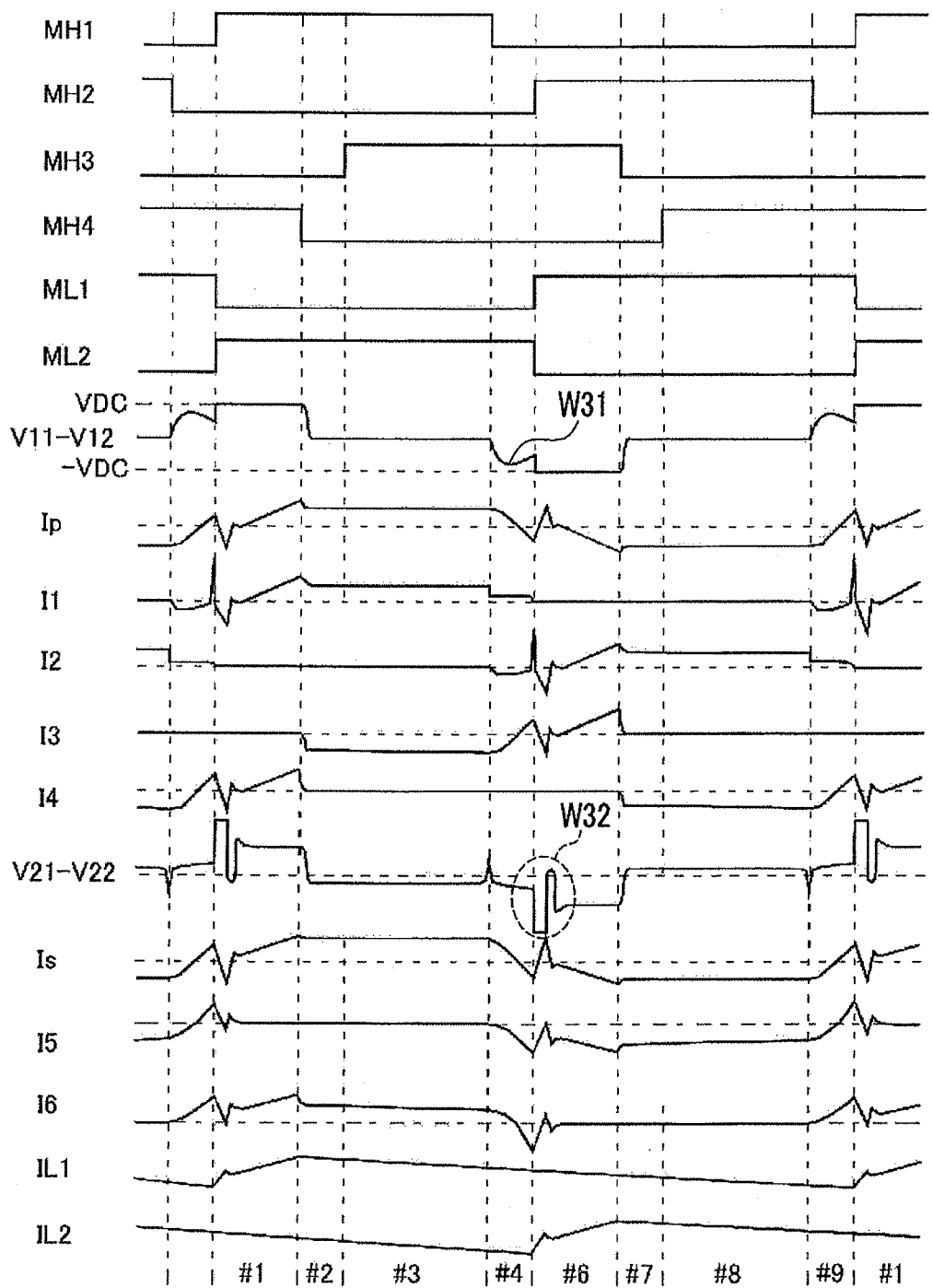
FIG. 3 is a timing chart showing operations of respective parts of a circuit when ZVS (Zero Voltage Switching) is not achieved under a light load of the power-supply unit shown in FIG. 1.
Figure 4:
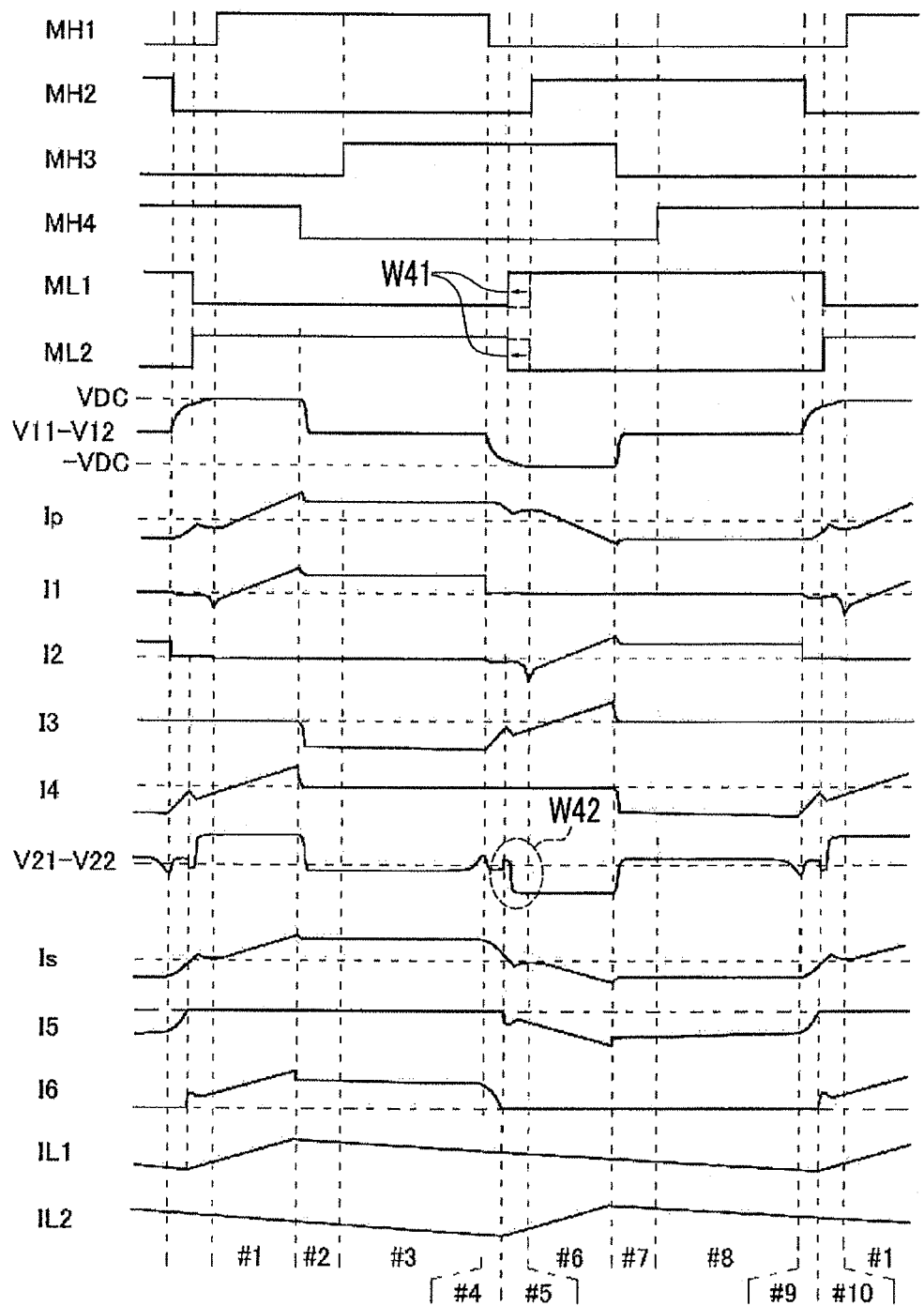
FIG. 4 is a timing chart showing operations of respective parts of a circuit when ZVS (Zero Voltage Switching) is achieved under a light load of the power-supply unit shown in FIG. 1.

In FIG. 2 to FIG. 4, a controlling signal given to each of the MOSFETs MH1 to MH4, ML1 and ML2 that are respective switches shown in FIG. 1 is shown by a controlling signal waveform of each of the controlling signals MH1 to MH4, ML1 and ML2 in FIG. 2 to FIG. 4. The controlling signal waveform at high means ON, and the controlling signal waveform at low means OFF. ON/OFF of the controlling signals ML1, ML2 is driven by a complementary pulse with duty 50%. A rise timing of the controlling signal ML1 and a fall timing of the controlling signal ML2 are set to be identical to a rise timing of the controlling signal MH2. In addition, a fall timing of the controlling signal ML1 and a rise timing of the controlling signal ML2 are set to be identical to a rise timing of the controlling signal MH1.

In addition, with respect to the timings of the controlling signals MH1, NH2 and the controlling signals MH3, MH4, an OFF period is set up as a dead time in consideration of short prevention of the top and bottom arm switches and a resonant operation time. Here, the MOSFETs MH1, MH2 are the top and bottom arm switches on the side that is required a resonant operation for achieving the ZVS.

References MH1 to MH4, ML1 and ML2 indicating respective switches consisting of MOSFETs in FIG. 1 correspond to respective references MH1 to MH4, ML1 and ML2 in FIG. 2 to FIG. 5, indicating controlling signals for controlling the respective switches, and the references are used for dual purposes. Then, the references MH1 to MH4, ML1 and ML2 indicate MOSFETs in the circuit diagrams, and also indicate controlling signals corresponding to the MOSFETs in the timing charts.

In addition, V11-V12, Ip, I1, I2, I3, I4, V21-V22, Is, I5, I6, IL1, and IL2 in FIG. 2 to FIG. 5 indicate voltages and operating waveforms of currents in the equivalent circuits of FIG. 6 to FIG. 11. It is noted that in the operating waveforms of FIG. 2 to FIG. 5, a timing of, for example, the dead time and a part of the operating waveform for circuit simulation are being enlarged for the purpose of the explanation below.

In FIG. 6 to FIG. 11, the respective switches indicated by the references MH1 to MH4, ML1 and ML2 correspond to respective MOSFETs MH1 to MH4, ML1 and ML2 in FIG. 1. If a contact of a switch shown by the references MH1 to MH4, ML1 and ML2 is closed with a horizontal bold line, it means that the switch is ON-state. In addition, references Cr1 to Cr4, Cs1 and Cs2 indicate electrostatic capacities parasitic to respective switch MOSFETs. Further, a reference Lr indicates a parasitic inductor component of a leakage inductor of the transformer TR and wirings.

In addition, references V11, V12 indicate terminal voltages of the primary coil Lp, and references V21, V22 indicate terminal voltages of the secondary coil Ls. A reference Ip and a reference Is indicate currents flowing in the primary coil Lp and the secondary coil Ls, respectively, references I1 to I6 indicate drain currents flowing in the respective MOSFETs MH1 to MH4, ML1 and ML2, and a reference Io indicate an output (load) current. Dotted lines and arrows in the figures indicate current flow paths. In addition, in FIG. 2 to FIG. 4, references IL1, IL2 indicating currents flowing in the choke coils L1, L2 are added to the forging references.

(Operations Under Rated Load and its Vicinity)

First, an operation under a rated load (and its vicinity) will be explained. A timing chart of FIG. 2 and equivalent circuit diagrams of FIG. 6 to FIG. 9 and FIG. 11 will be used.

Figure 6:
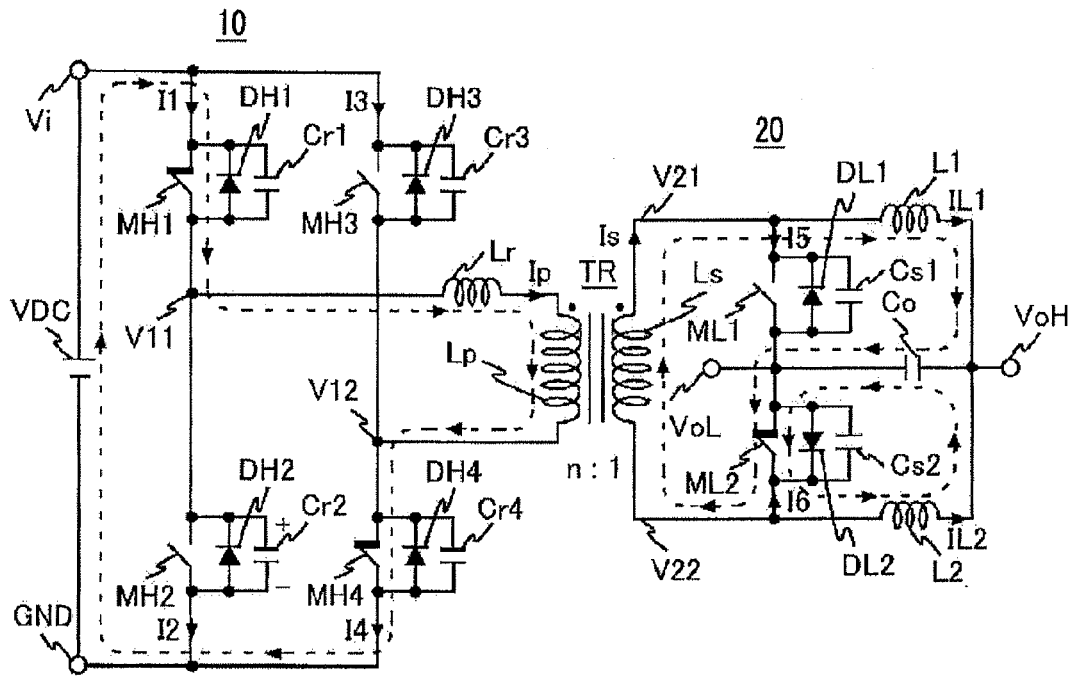
FIG. 6 is an equivalent circuit showing statuses of respective switches of a circuit of the power-supply unit shown in FIG. 1 during a period #1 in FIG. 2 to FIG. 4 and current flows in respective parts of the circuit.

In the period #1 of FIG. 2, as shown in FIG. 6, the arm switches MH1, MH4 in the full bridge circuit 10 (see FIG. 1 in detail) on the primary side are turned on, and the arm switches MH2, MH3 in the full bridge circuit 10 are turned off. In this case, in the current doubler type rectifier and smoothing circuit 20 (see FIG. 1 in detail) on the secondary side, the synchronous rectifier switch ML1 is turned off, and the synchronous rectifier switch ML2 is turned on. Then, a DC voltage VDC is applied to the primary coil Lp of the transformer TR, and a current Ip flows in the primary coil Lp. Hence, a voltage is induced in the secondary coil Ls of the transformer TR depending on the turn ratio n, and power is transmitted from the primary side to the secondary side, accordingly. Meanwhile, in the current doubler type rectifier and smoothing circuit 20 on the secondary side, since the synchronous rectifier switch ML1 is turned off and the synchronous rectifier switch ML2 is turned on, a current flows from the choke coil L1 to a load (not shown) connected in parallel with the output capacitor Co, and further to the synchronous rectifier switch ML2 to accumulate energy in the choke coil L1.

Figure 7:
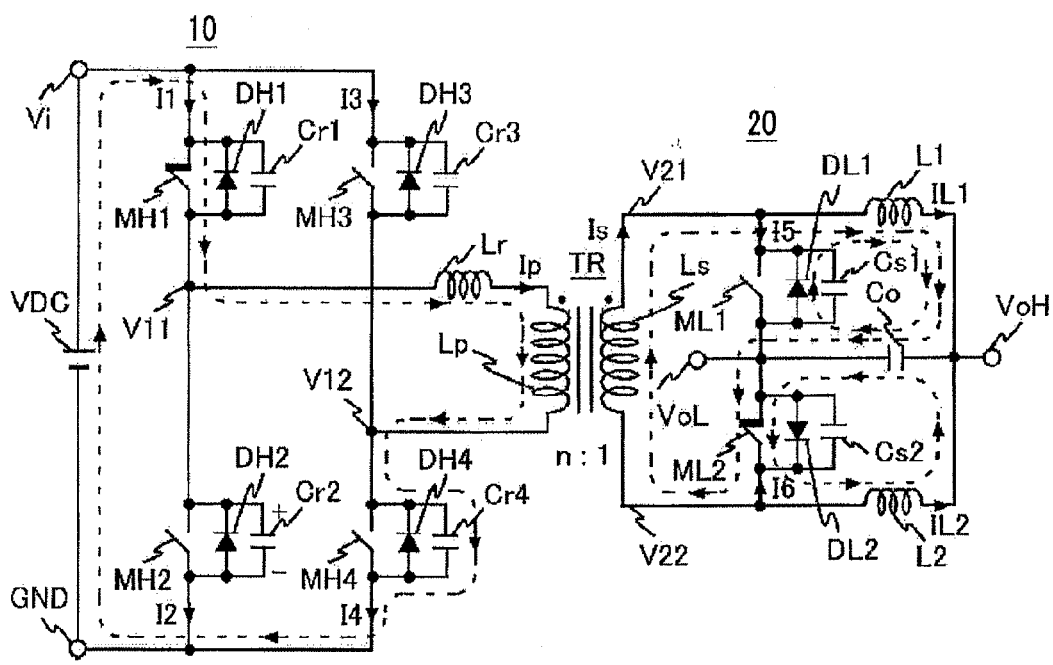
FIG. 7 is an equivalent circuit showing statuses of respective switches of a circuit of the power-supply unit shown in FIG. 1 during a period #2 in FIG. 2 to FIG. 4 and current flows in respective parts of the circuit.

In the period #2 of FIG. 2, as shown in FIG. 7, the arm switch MH1 in the full bridge circuit 10 (see FIG. 1 in detail) on the primary side is turned on, and the arm switches MH4, MH2 and MH3 in the full bridge circuit 10 are turned off. In this case, in the current doubler type rectifier and smoothing circuit 20 on the secondary side, the synchronous rectifier switch ML1 is maintained to be OFF and the synchronous rectifier switch ML2 is maintained to be ON as with the period #1 of FIG. 2. Therefore, on the primary side, the current Ip tends to flow in the primary coil Lp of the transformer TR even if the arm switch MH4 is turned off. Then, the current Ip of the primary coil Lp flows toward the parasitic electrostatic capacity Cr4 of the arm switch MH4 to charge it, and thereby the terminal voltage V12 of the primary coil Lp increases.

In addition, in the current doubler type rectifier and smoothing circuit 20 (see FIG. 1 in detail) on the secondary side, energy accumulated in the choke coil L1 flows toward the parasitic electrostatic capacity Cs1 of the synchronous rectifier switch ML1 to charge it. Therefore, a voltage between both ends of the parasitic electrostatic capacity Cs1 becomes a forward voltage drop Vd of the body diode DL1. Namely, the terminal voltage V21 of the secondary coil Ls is lowered by the amount of the forward voltage drop Vd.

In this case, if the terminal voltage V12 of the primary coil Lp is increased and reached the DC voltage VDC, an interterminal voltage V11-V12 of the primary coil Lp varies from the VDC to 0 (zero) volt. Therefore, if the arm switch MH3 is turned on after the period #2, the arm switch MH3 can be turned on at a timing when a drain-to-source voltage becomes 0 (zero) volt. Hence, a switching loss of the arm switch MH3 can be minimized. In the period #2, a time until the interterminal voltage V11-V12 of the primary coil Lp varies from the DC voltage VDC to 0 volt, that is, a time until the terminal voltage V12 of the primary coil Lp rises to the DC voltage VDC, is related to the DC voltage VDC as well as the parasitic electrostatic capacity Cr4 of the arm switch MH4 and a load dependent current. Here, since the DC voltage VDC is large, the time always becomes a certain constant time, and the time is not effected by the load dependent current.

Figure 8:
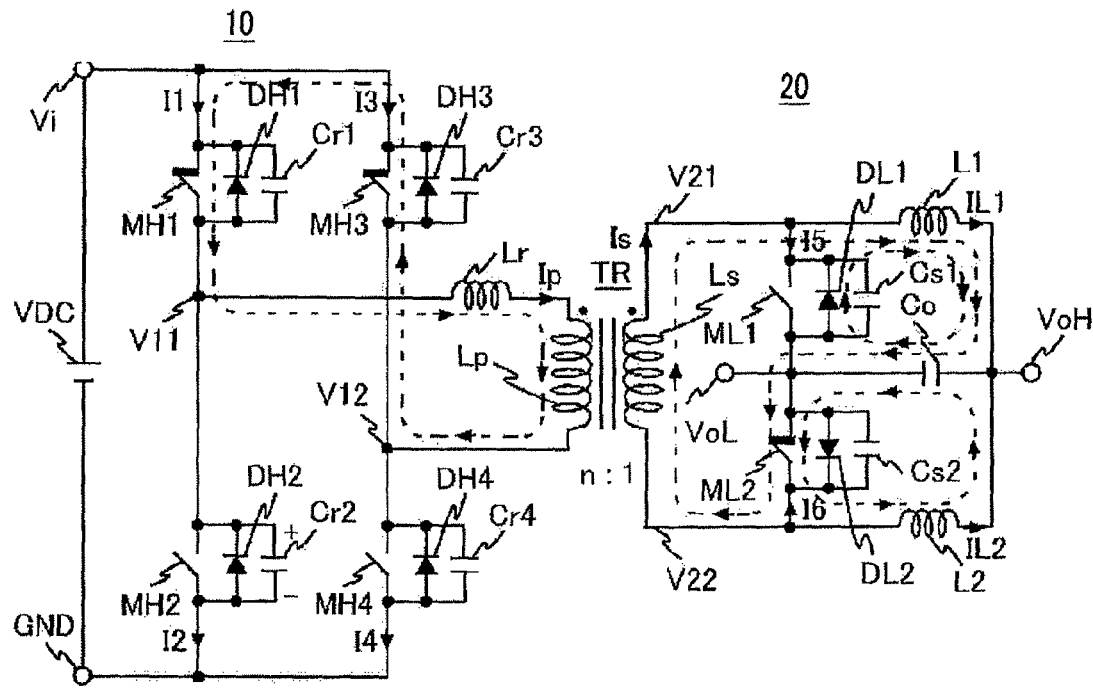
FIG. 8 is an equivalent circuit showing statuses of respective switches of a circuit of the power-supply unit shown in FIG. 1 during a period #3 in FIG. 2 to FIG. 4 and current flows in respective parts of the circuit.

Next, in the period #3 of FIG. 3, as shown in FIG. 8, the arm switches MH1 and MH3 in the full bridge circuit 10 (see FIG. 1 in detail) on the primary side are turned on, and the arm switches MH4 and MH3 in the full bridge circuit 10 are turned off. In this case, in the current doubler type rectifier and smoothing circuit 20 (see FIG. 1 in detail) on the secondary side, the synchronous rectifier switch ML1 is maintained to be OFF and the synchronous rectifier switch ML2 is maintained to be ON as with the period #2 of FIG. 2. Then, the primary coil Lp of the transformer TR becomes a short circuited state that is an idle state where the current continuously flows, while in the current doubler type rectifier and smoothing circuit 20 on the secondary side, energy accumulated in the secondary coil Ls and choke coils L1, L2 is discharged, and consumed in the load (not shown) connected in parallel with the output capacitor Co.

Figure 9:
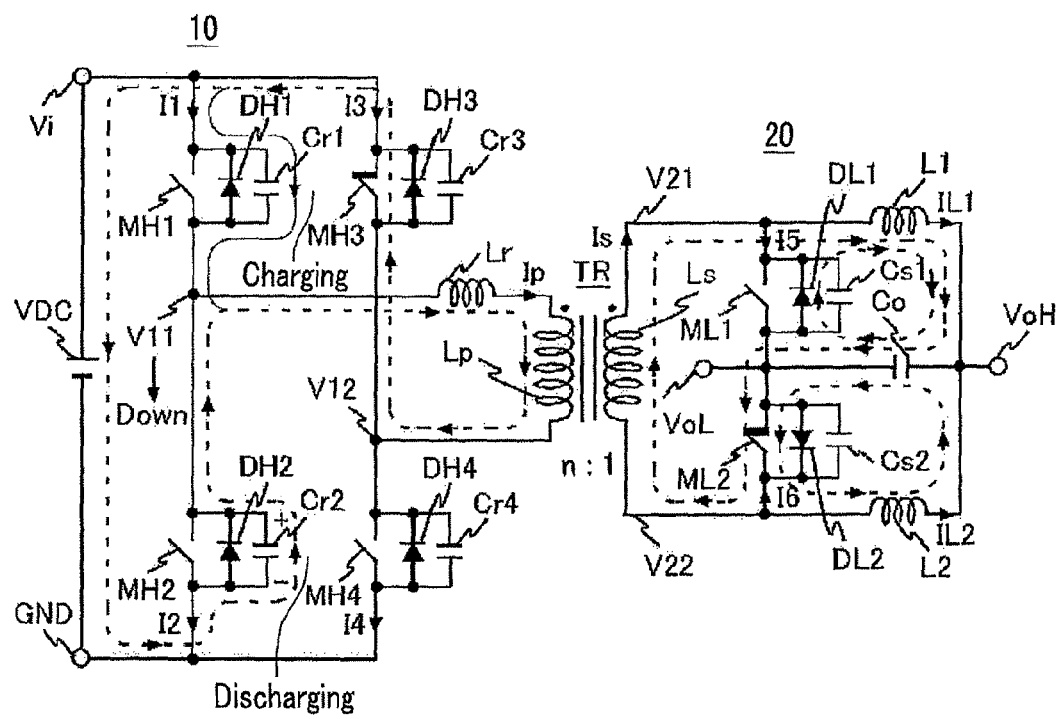
FIG. 9 is an equivalent circuit showing statuses of respective switches of a circuit of the power-supply unit shown in FIG. 1 during a period #4 in FIG. 2 to FIG. 4 and current flows in respective parts of the circuit.

In the next period #4 of FIG. 2, as shown in FIG. 9, the arm switches MH1, MH2 and MH4 in the full bridge circuit 10

(see FIG. 1 in detail) on the primary side are turned off, and the arm switch MH3 in the full bridge circuit 10 is turned on. In this case, in the current doubler type rectifier and smoothing circuit 20 (see FIG. 1 in detail) on the secondary side, the synchronous rectifier switch ML1 is maintained to be OFF and the synchronous rectifier switch ML2 is maintained to be ON as with the period #3 of FIG. 2. Then, in the full bridge circuit 10 on the primary side, energy in the primary coil Lp flows into a path to charge the parasitic electrostatic capacity Cr1 of the arm switch MH1 up to the DC voltage VDC and a path to discharge energy accumulated in the parasitic electrostatic capacity Cr2 of the arm switch MH2. Then, the terminal voltage V11 of the primary coil Lp rapidly decreases. In this case, since the parasitic electrostatic capacity Cr2 of the arm switch MH2 and the parasitic inductor Lr of the primary coil Lp form a serial resonant circuit, the terminal voltage V11 of the primary coil Lp drops approximately in sine wave shape (see waveform W21 in FIG. 2).

Here, a time tr until a resonant peak voltage (absolute value) of the serial resonant circuit, which consists of Cr and Lr that are required so that the terminal voltage V11 of the primary coil Lp decreases in the sine wave shape, reaches a peak value (minimum value, for example, 0 voltage) from the VDC is expressed by the following formula <1>, assuming that Cr is Cr2.

$$tr = \{2\pi \times (Lr \times Cr)^{1/2}\}/4 \qquad <1>$$

In addition, a resonant peak voltage Vpp is expressed by the following formula <2>, assuming that Io is an output (load) current and n is a turn ratio of the transformer TR.

$$Vpp = (Io/2)/n \times \{(Lr/Cr)^{1/2}\} \qquad <2>$$

From the formula <1>, it is known that if the arm switch MH2 is turned on when a time tr elapsed after the arm switch MH1 was turned off in the period #3, the arm switch MH2 can be turned on at a timing that a drain-to-source voltage of the arm switch MH2 is 0 (zero) volt.

In the embodiment, when the time tr elapsed after a controlling signal of the arm switch MH1 was turned off, a controlling signal of the arm switch MH2 is turned on so as to meet the condition of the formula <1>. When the time tr elapsed after the arm switch MH1 was turned off, that is, at the timing after the drain-to-source voltage of the arm switch MH2 decreased from the DC voltage VDC to 0 volt, the arm switch MH2 is turned on. As a result, a loss in the arm switch MH2 can be minimized. Namely, it is known that the loss is minimized because the ZVS (Zero Voltage Switching) can be achieved through the resonant operation during the period.

Figure 11:
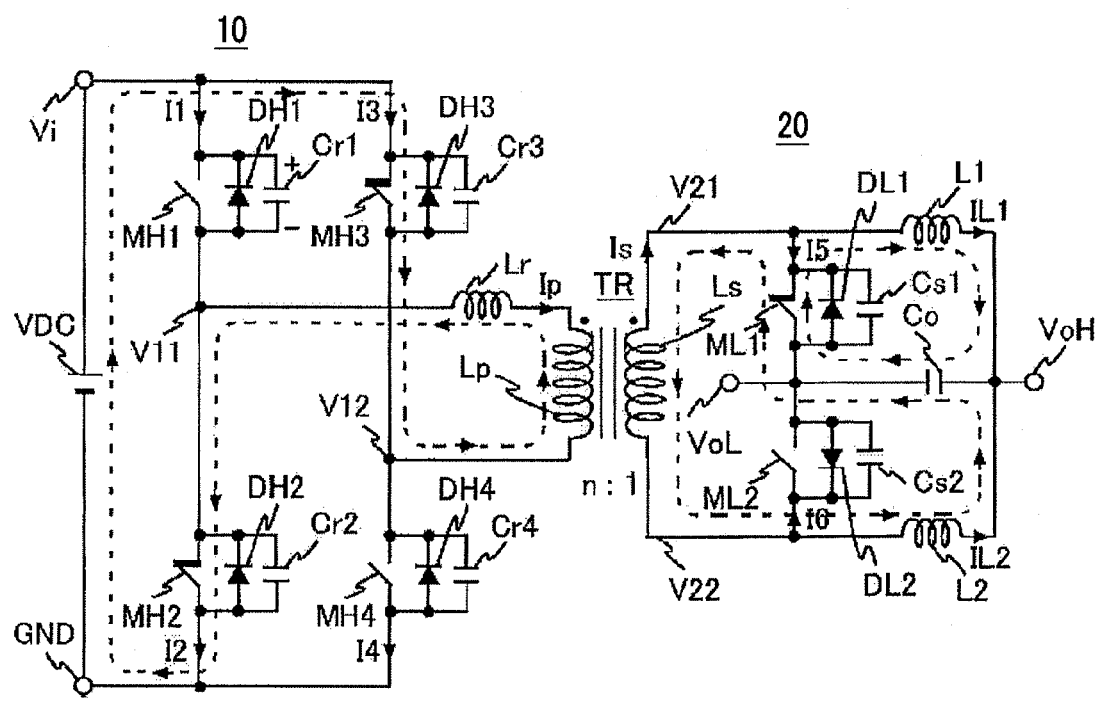
FIG. 11 is an equivalent circuit showing statuses of respective switches of a circuit of the power-supply unit shown in FIG. 1 during a period #6 in FIG. 2 to FIG. 4 and current flows in respective parts of the circuit.

Next, in the period #6 of FIG. 2, as shown in FIG. 11, the arm switches MH2 and MH3 in the full bridge circuit 10 (see FIG. 1 in detail) on the primary side are turned on, and the arm switches MH1 and MH4 in the full bridge circuit 10 are turned off. In this case, in the current doubler type rectifier and smoothing circuit 20 (see FIG. 1 in detail) on the secondary side, the synchronous rectifier switch ML1 is turned on and the synchronous rectifier switch ML2 is turned off. Then, directions of the currents Ip, Is flowing in each of the primary coil Lp and the secondary coil Ls of the transformer TR are reversed, respectively, thereby a DC voltage −VDC is impressed to the inter-terminal voltage V11-V12 of the primary coil Lp of the transformer TR. Therefore, a current in a direction opposite to that of FIG. 6 flows in the primary coil Lp, and power is transmitted from the primary side to the secondary side. In this case, in the current doubler type rectifier and smoothing circuit 20 on the secondary side, since the synchronous rectifier switch ML1 is in ON-state and the synchronous rectifier switch ML2 is in OFF-state, a current flows from the choke coil L2 to a load (not shown) connected in parallel with the output capacitor Co, and further to the synchronous rectifier switch ML1 to accumulate energy in the choke coil L2.

After that, in the periods #7 to #9 of FIG. 2, controls are conducted through the same procedure explained by using FIG. 7 to FIG. 9. Namely, although not shown, in the period #7, the arm switch MH2 in the full bridge circuit 10 on the primary side is turned on, and the arm switches MH3, MH1 and MH4 in the full bridge circuit 10 are turned off. In this case, in the current doubler type rectifier and smoothing circuit 20 on the secondary side, the synchronous rectifier switch ML1 is maintained to be ON and the synchronous rectifier switch ML2 is maintained to be OFF as with the period #6. Therefore, on the primary side, the current Ip tends to continue flowing in the primary coil Lp of the transformer TR even if the arm switch MH3 is turned off. Then, the current Ip of the primary coil Lp flows toward the parasitic electrostatic capacity Cr3 of the arm switch MH3 to charge it, thereby the terminal voltage V12 of the primary coil Lp decreases. In addition, in the current doubler type rectifier and smoothing circuit 20 on the secondary side, energy accumulated in the choke coil L2 flows toward the parasitic electrostatic capacity Cs2 of the synchronous rectifier switch ML2 to charge it. Then, a voltage between both ends of the parasitic electrostatic capacity Cs2 becomes a forward voltage drop Vd of the body diode DL2. Namely, the terminal voltage V22 of the secondary coil Ls is lowered by the amount of the forward voltage drop Vd.

In this case, if the terminal voltage V12 of the primary coil Lp is decreased to reach the DC voltage −VDC, an inter-terminal voltage V11-V12 of the primary coil Lp varies from the −VDC to 0 (zero) volt. Therefore, if the arm switch MH4 is turned on after the period #7, the arm switch MH4 can be turned on at a timing when a drain-to-source voltage becomes 0 (zero) volt. Hence, a switching loss of the arm switch MH4 can be minimized. In the period #7, a time until the inter-terminal voltage V11-V12 of the primary coil Lp varies from the DC voltage −VDC to 0 (zero) volt, namely, a time until the terminal voltage V12 of the primary coil Lp is lowered to the DC voltage −VDC is related to the DC voltage VDC as well as the parasitic electrostatic capacity Cr3 of the arm switch MH3 and a load dependent current. Therefore, since the DC voltage VDC is large, the time always becomes a certain constant time, and the time is not effected by the load dependent current.

Next, in the period #8 of FIG. 2, the arm switches MH2 and MH4 in the full bridge circuit 10 on the primary side are turned on, and the arm switches MH3 and MH1 in the full bridge circuit 10 are turned off. In this case, in the current doubler type rectifier and smoothing circuit 20 on the secondary side, the synchronous rectifier switch ML1 is maintained to be ON and the synchronous rectifier switch ML2 is maintained to be OFF as with the period #7. Then, the primary coil Lp of the transformer TR becomes a short circuited state that is an idle state where the current continuously flows, while in the current doubler type rectifier and smoothing circuit 20 on the secondary side, energy accumulated in the secondary coil Ls and choke coils L1, L2 is discharged, and consumed in the load (not shown) connected in parallel with the output capacitor Co.

In the next period #9 of FIG. 2, the arm switches MH2, MH3 and MH1 in the full bridge circuit 10 on the primary side are turned off, and the arm switch MH4 in the full bridge circuit 10 is turned on. In this case, in the current doubler type rectifier and smoothing circuit 20 on the secondary side, the synchronous rectifier switch ML1 is maintained to be ON and the synchronous rectifier switch ML2 is maintained to be OFF as with the period #8. Then, in the full bridge circuit 10 on the primary side, energy in the primary coil Lp flows into a path to charge the parasitic electrostatic capacity Cr2 of the arm switch MH2 up to the DC voltage VDC and a path to discharge energy accumulated in the parasitic electrostatic capacity Cr1 of the arm switch MH1. As a result, the terminal voltage V11 of the primary coil Lp rapidly increases (see waveform W22).

In this case, since the parasitic electrostatic capacity Cr1 of the arm switch MH1 and the parasitic inductor Lr of the primary coil Lp form a serial resonant circuit, the terminal voltage V11 of the primary coil Lp rises approximately in sine wave shape. Then, after the arm switch MH2 is turned off so as to meet the condition of the formula <1>, the arm switch MH1 is turned on at a timing after the drain-to-source voltage of the arm switch MH1 becomes 0 (zero) volt from the DC voltage VDC. Then, a loss in the arm switch MH1 can be minimized. Namely, the loss is minimized because the ZVS (Zero Voltage Switching) can be achieved through the resonant operation in the period. After this, the procedure returns to the period #1 to be repeated.

As described above, the arm switches MH1 to MH4 can be turned on under the condition that respective drain-to-source voltages of the arm switches MH1 to MH4 are substantially 0 (zero) volt by keeping the timings of FIG. 2. Accordingly, the ZVS (Zero Voltage Switching) can be achieved for all arm switches MH1 to MH4.

(Operations Under Light Load)

Next, operations under a light load will be described. It was described that the ZVS through resonant operation can be achieved and a loss of the arm switch MH2 can be minimized in the period #4 of FIG. 2. This is because the load was under a rated load (and its vicinity), and a resonant peak voltage Vpp reached the DC voltage VDC, as understood from the formula <2>. However, if the load is light, since a load current Io decreases, the Io in the formula <2> becomes small, and as a result, the resonant peak voltage Vpp does not reach the DC voltage VDC. Therefore, if the arm switch MH2 is turned on under the condition that the terminal voltage V11 of the primary coil Lp does not reach the peak value (minimum value, for example, 0 volt), the arm switch MH2 is turned on before the drain-to-source voltage becomes 0 volt. As a result, a loss is generated in the arm switch MH2. In addition, since the output current Io becomes smaller as the load becomes lighter, the resonant peak voltage Vpp clearly becomes smaller than the DC voltage VDC. Therefore, if the arm switch MH2 is turned on at this timing, the loss is increased since the ZVS is not achieved.

This is shown by a timing chart of FIG. 3. To be focused is the inter-terminal voltage V11-V12 of the primary coil in the case that the resonant peak voltage Vpp does not reach the DC voltage −DVC (waveform W31) in the period #4. In this case, a spike current is superimposed on a drain current I2 of the arm switch MH2 at the timing that the arm switch MH2 is turned on, thereby a switching loss is generated. In addition, in the inter-terminal voltage V21-V22 of the secondary coil, a large voltage exceeding a breakdown voltage of the body diode DL2 of the synchronous rectifier switch ML2 is induced in the terminal voltage V22 of the secondary coil Ls at the timing that the synchronous rectifier switch ML1 is turned on and the synchronous rectifier switch ML2 is turned off, although this is the operation waveform by a circuit simulation (waveform W32). As a result, a breakdown occurs in the body diode DL2 to generate a loss.

The reason for generating the forgoing loss under a light load is that the ZVS is not achieved in the period #4. In order to achieve the ZVS, timings of the synchronous rectifier switches ML1, ML2 are changed as shown in FIG. 4. Namely, switching timings of the synchronous rectifier switches ML1, ML2 are shifted from the trailing edge to the leading edge side of the OFF periods of the top and bottom arm switches MH1, MH2 on the lag phase side of the full bridge circuit 10, that is, the switching timing is shifted from a rise timing of a switch switching from OFF to ON to a fall timing of a switch switching from ON to OFF of the top and bottom arm switches MH1, MH2 on the lag phase side of the full bridge circuit 10. Meanwhile, the switching timings of the synchronous rectifier switches ML1, ML2 are shifted by the timing variable means provided in the control circuit CONT.

In order to achieve the shift of the timing described above, a period #5 shown in FIG. 4 is newly provided.

Hereinafter, using the period #5 which is newly provided in the embodiment shown in FIG. 4, operations for achieving the ZVS will be explained in reference to equivalent circuits in FIG. 10A to FIG. 10D.

The period #5 in FIG. 4 is formed as follows. The period #4 shown in FIG. 3 is divided into two parts, the period #4 and the period #5, as shown in FIG. 4. The period #5 is the latter half of the two parts and the former half is the period #4 as before. Then, the switches MH1 to MH4, ML1 and ML2 are turned on and off as before in the period #4 of FIG. 4. Namely, the arm switches MH1, MH2 and MH4 of the full bridge circuit 10 on the primary side are turned off, and the arm switch MH3 is turned on. In addition, in this case, in the current doubler type rectifier and smoothing circuit 20 on the secondary side, the synchronous rectifier switch ML1 is turned off and the synchronous rectifier switch ML2 is turned on.

Figure 5:
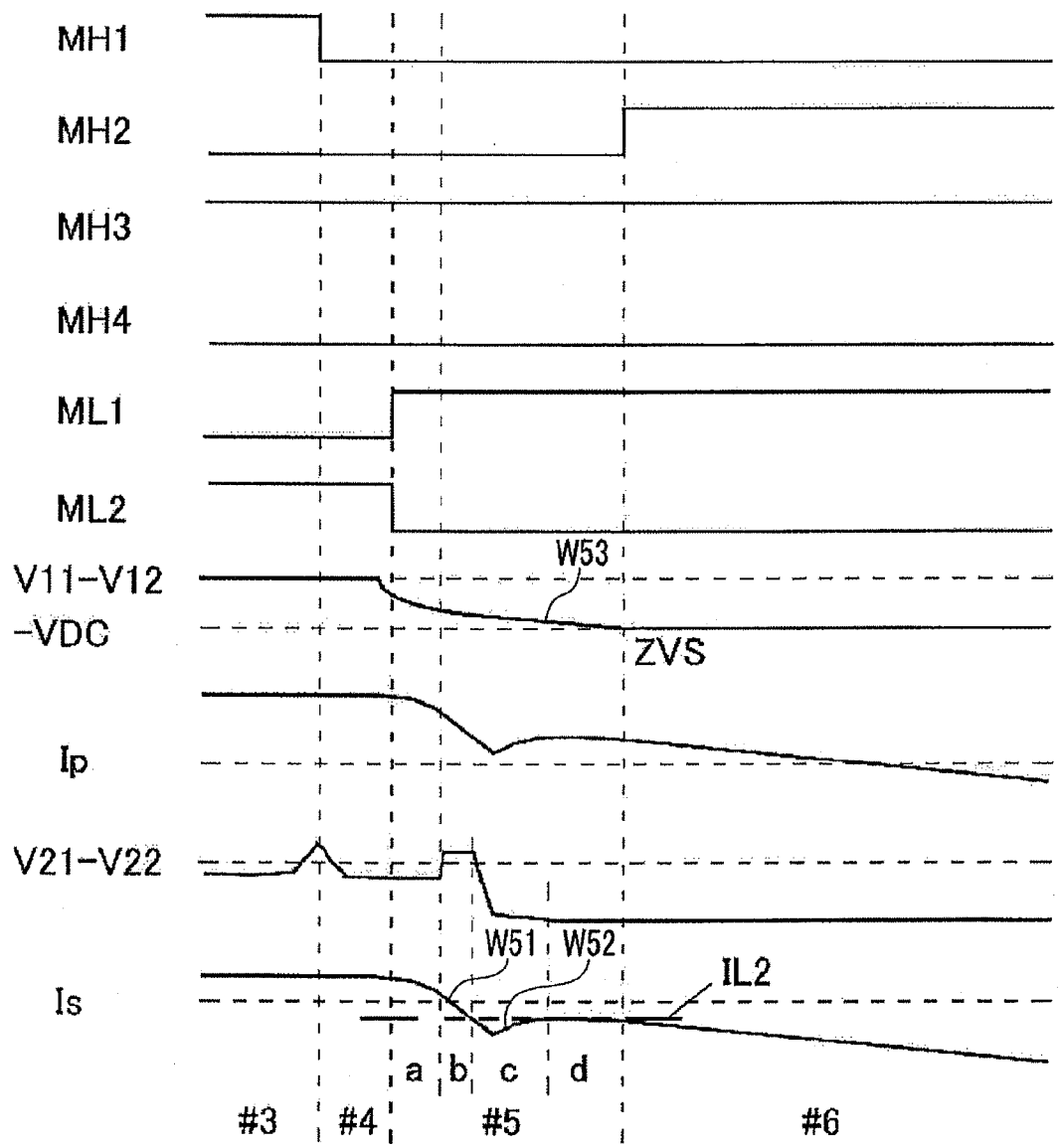
FIG. 5 is a timing chart showing operations of respective parts of a circuit of the power-supply unit shown in FIG. 1, where the operations during a period #5 in FIG. 4 are enlarged.
Figure 10A:
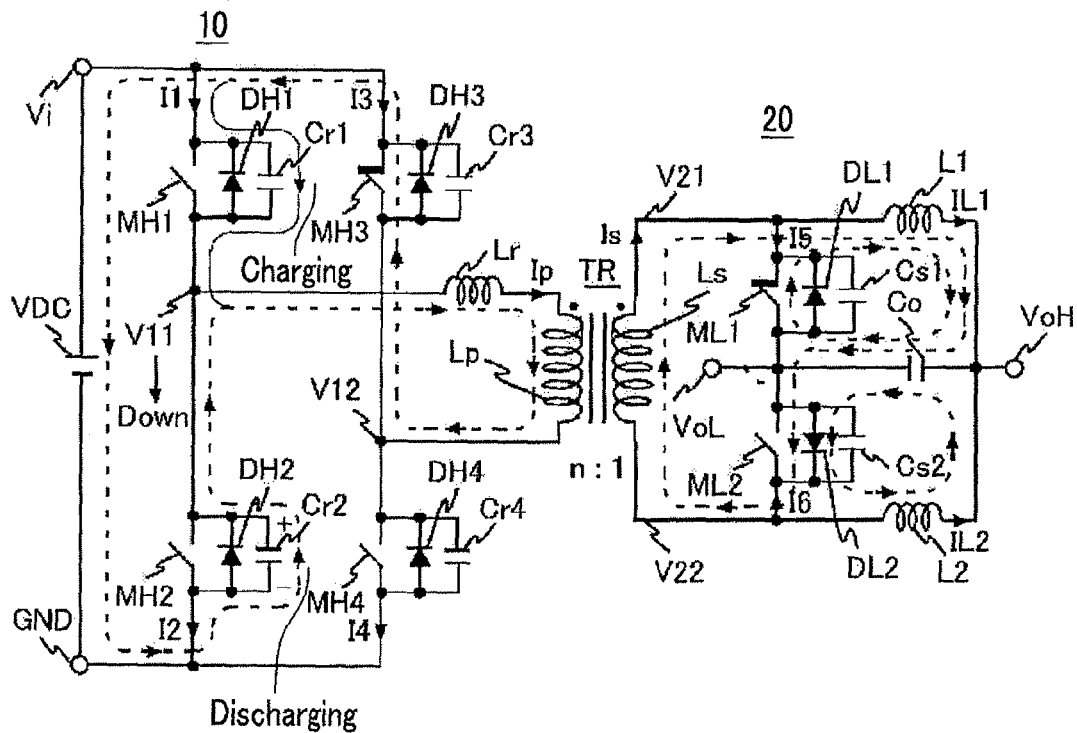
FIG. 10A is an equivalent circuit showing statuses of respective switches of a circuit of the power-supply unit shown in FIG. 1 during a period #5-*a* in FIG. 5 and current flows in respective parts of the circuit.

In the next period #5 in FIG. 4, as typically shown in FIG. 10A, the arm switches MH1, MH2 and MH4 in the full bridge circuit 10 (see FIG. 1 in detail) on the primary side are turned off, and the arm switch MH3 in the full bridge circuit 10 is turned on, as with the period #4. In this case, in the current doubler type rectifier and smoothing circuit 20 (see FIG. 1 in detail) on the secondary side, the synchronous rectifier switch ML1 is turned on and the synchronous rectifier switch ML2 is turned off (waveform W41). Then, even if the ON/OFF states of the switches are the same, the operation area is divided into four operation areas in the period #5 by a relation (state) between a current Is flowing in the secondary coil Ls of the transformer TR and a current IL2 flowing in the choke coil L2 as shown in FIG. 5.

Namely, the operation area is divided as follows. It is noted that "a" area in the period #5 in FIG. 5 is described as "period #5-a". Other "b" to "d" areas are described similar to the "a" area.

1) Period #5-a is the area that a current Is flowing in the secondary coil Ls is in the positive area.
2) Period #5-b is the area that a direction of the current Is flowing in the secondary coil Ls is changed from the positive direction to the negative direction, and the current Is flowing in the secondary coil Ls becomes identical to the current IL2 flowing in the choke coil L2.
3) Period #5-c is the area that the current Is flowing in the secondary coil Ls exceeds the current IL2 flowing in the choke coil L2 and returns to the current IL2 flowing in the choke coil L2.
4) Period #5-d is the area that the current Is flowing in the secondary coil Ls finally converges at the current IL2 flowing in the choke coil L2 to be identical to the current IL2.

Here, the current IL2 flowing in the choke coil L2 may be considered as a constant current in a fine period. Therefore, the current IL2 is treated as a constant current in FIG. 5.

Hereinafter, the periods #5-*a* to #5-*d* will be explained sequentially.

1) Period #5-*a*

In the period #5-*a* in FIG. 5, as shown in FIG. 10A, a current flowing in the body diode DL1 in the period #4 is switched to a current in the synchronous rectifier switch ML1, and a current flowing in the synchronous rectifier switch ML2 in the period #4 is switched to a current in the body diode DL2. Here, a current summing the current Is of the secondary coil Ls and the current IL2 of the choke coil L2 flows in the body diode DL2. Therefore, the terminal voltage V22 of the secondary coil Ls decreases by an amount of the forward drop voltage Vd of the body diode DL2.

2) Period #5-*b*

Figure 10B:
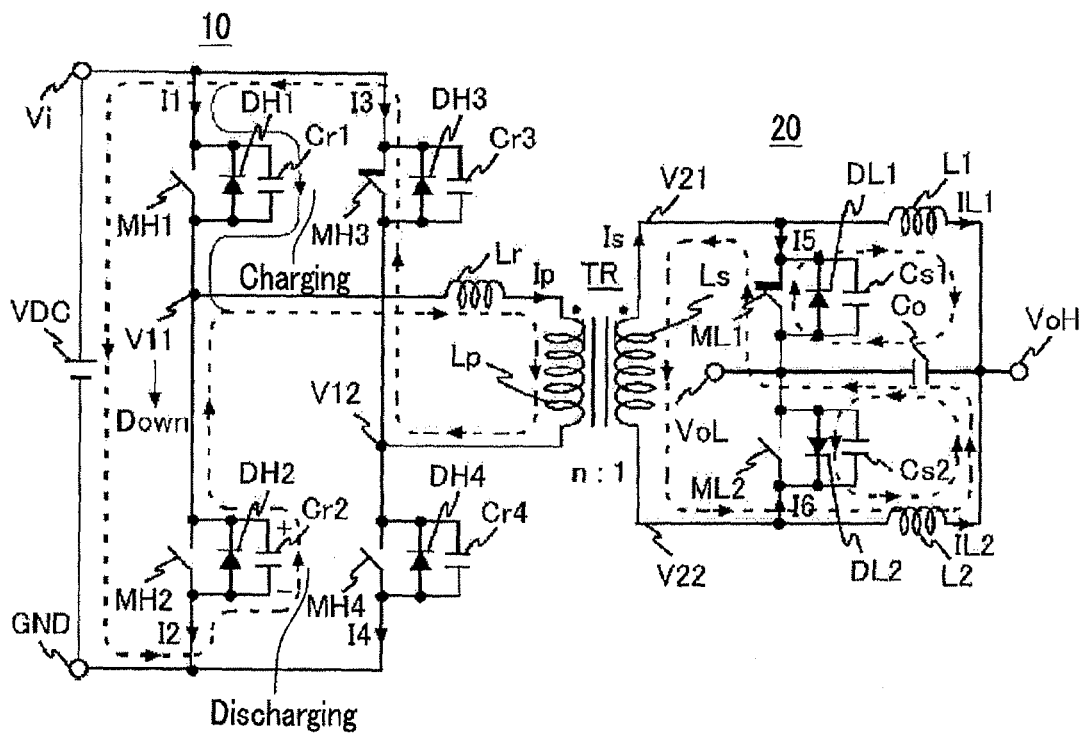
FIG. 10B is an equivalent circuit showing statuses of respective switches of a circuit of the power-supply unit shown in FIG. 1 during a period #5-*b* in FIG. 5 and current flows in respective parts of the circuit.

In the next period #5-*b* in FIG. 5, a direction of the current Is flowing in the secondary coil Ls is changed from the positive direction to negative direction. As a result, the direction of the current Is inverted (waveform W51) from the direction in the period #5-*a*, and as shown in FIG. 10B, the current Is flows from the choke coil L2 to a load (not shown) connected in parallel with the output capacitor Co, and further to the synchronous rectifier switch ML1. Then, with respect to the body diode DL2 where the current IL2 with a constant value was flowing in the choke coil L2 in the period #5-*a*, if the current Is flowing in the secondary coil Ls is added to the choke coil L2, a current flowing in the body diode DL2 decreases by the amount of increase in the current Is flowing in the secondary coil Ls. In addition, if the current Is flowing in the secondary coil Ls is increased in the negative direction to be identical to the constant value of the current IL2 flowing in the choke coil L2, current flow stops in the body diode DL2. Then, the body diode DL2 becomes non-conductive to be cut-off, and the step enters the next period #5-*c*.

3) Period #5-*c*

Figure 10C:
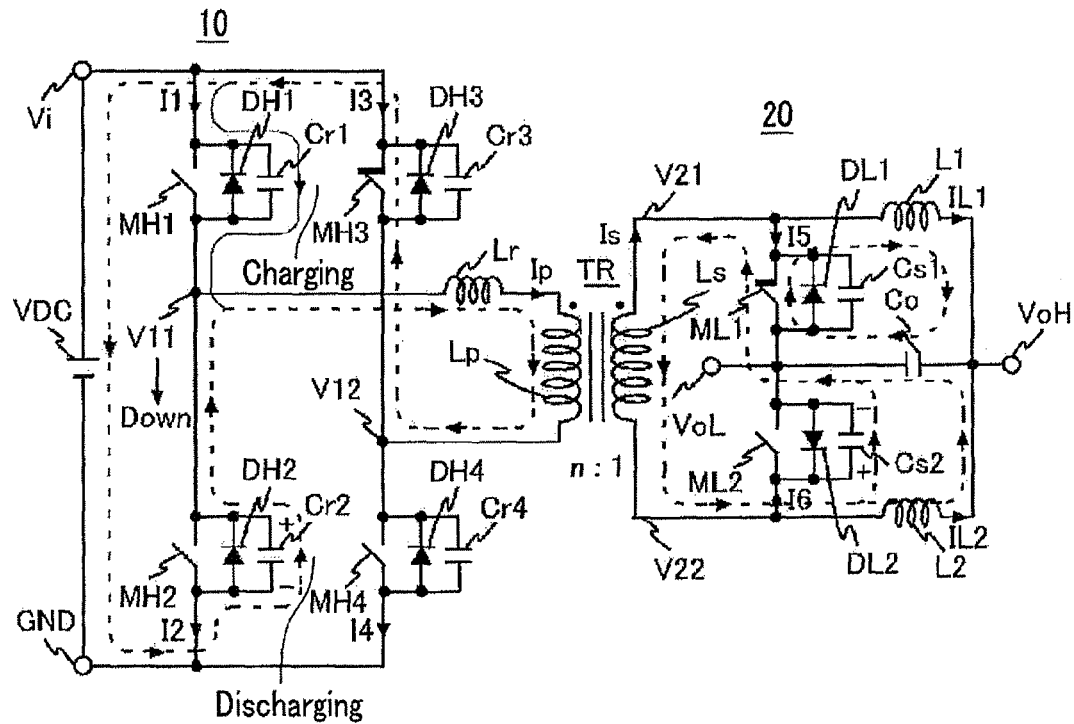
FIG. 10C is an equivalent circuit showing statuses of respective switches of a circuit of the power-supply unit shown in FIG. 1 during a period #5-*c* in FIG. 5 and current flows in respective parts of the circuit.

In the period #5-*c* in FIG. 5, if the current Is flowing in the secondary coil Ls is further increased in the negative direction, the current Is exceeds the constant value of the current IL2 flowing in the choke coil L2. Therefore, an amount of current which exceeds the constant value of the current IL2 flowing in the choke coil L2, of the current Is flowing in the secondary coil flows into a parasitic capacitor Cs2 of the synchronous rectifier switch ML2 as an surplus current, while charging the parasitic capacitor Cs2, as shown in FIG. 10C. Then, the terminal voltage of the synchronous rectifier switch ML2, namely, the terminal voltage V22 of the secondary coil Ls is rapidly increased to around a voltage which is a sum of the output voltage Vo and a voltage between both ends of the choke coil L2. Due to this rapid increase in the voltage, the current Is flowing in the secondary coil Ls is suppressed, thereby the surplus current flowing in the parasitic capacitor Cs2 of the synchronous rectifier switch ML2 decreases. Then, the current Is flowing in the secondary coil Ls gradually returns to the constant value of the current IL2 flowing in the choke coil L2 (waveform W52).

4) Period #5-*d*

Figure 10D:
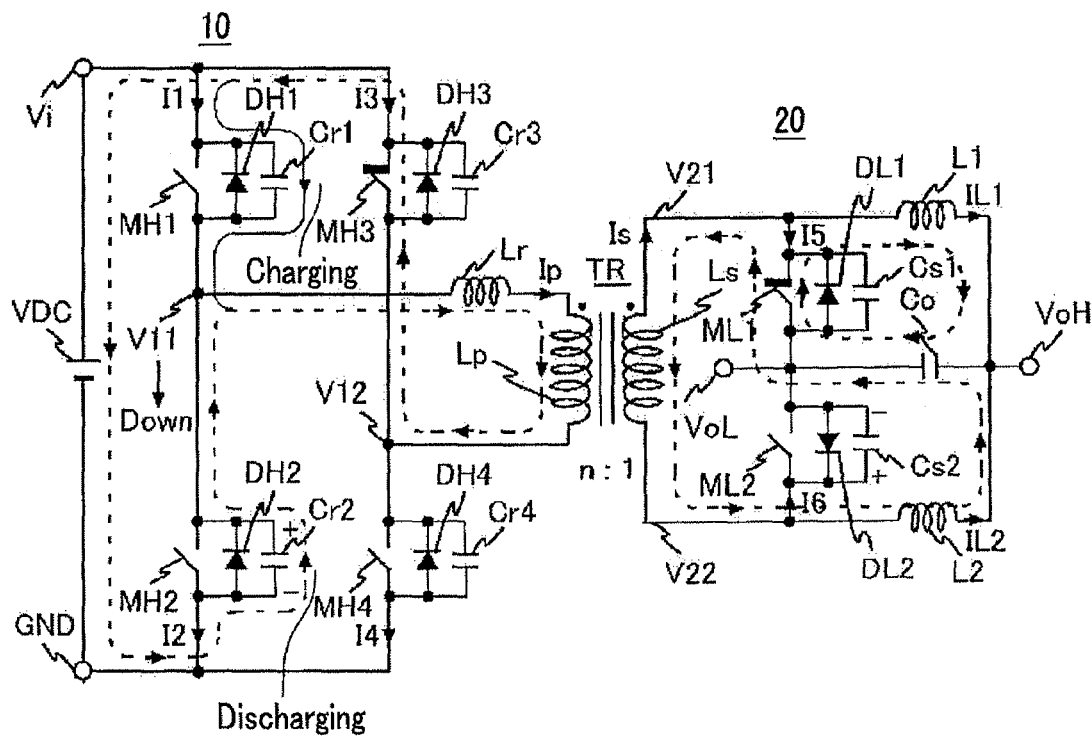
FIG. 10D is an equivalent circuit showing statuses of respective switches of a circuit of the power-supply unit shown in FIG. 1 during a period #5-*d* in FIG. 5 and current flows in respective parts of the circuit.

In the last period #5-*d* in FIG. 5, the surplus current which was flowing in the parasitic capacitor Cs2 of the synchronous rectifier switch ML2 in the period #5-*c* finally becomes zero. Therefore, as shown in FIG. 10D, the current Is flowing in the secondary coil Ls converses at the constant value of the current IL2 flowing in the choke coil L2 to be identical to the constant value. Due to a set of these operations, energy of the current doubler type rectifier and smoothing circuit 20 (see FIG. 1 in detail) on the secondary side, namely, the energy accumulated in the choke coil L2 flows into the secondary coil Ls of the transformer TR. The energy is transmitted to the primary coil Lp and suppresses a decrease in the current Ip flowing in the primary coil Lp to maintain a positive constant value of the current Ip flowing in the primary coil Lp. The positive constant value of the current Ip of the primary coil Lp works to promote charging (or discharging of parasitic electrostatic capacity Cr2 of the arm switch MH2) of the parasitic electrostatic capacity Cr1 of the arm switch MH1. Then, the terminal voltage V11 of the primary coil Lp decreases to 0 (zero) volt in the sine wave shape (waveform W53). Namely, since the energy transmitted to the primary coil Lp has an effect to increase a current of a circuit on the primary side corresponding to Io/n in the formula <2>, the resonant peak voltage Vpp reaches the DC voltage VDC under a light load so that the ZVS can be achieved.

In addition, as a result of the operations described above, a voltage variation of the waveform W42 in the period #5 in FIG. 4, which briefly summarizes the periods #5-*a* to #5-*d*, is small in comparison with that of the waveform W32 which is a voltage waveform of V21-V22 at the starting portion of the period #6 in FIG. 3.

In addition, the period #9 shown in FIG. 3 is divided into the period #9 and period #10 as shown in FIG. 4. In the period #9 of FIG. 4, the arm switches MH2, MH3 and MH1 in the full bridge circuit 10 on the primary side are turned off, and the arm switch MH4 in the full bridge circuit 10 is turned on as with the period #9 in FIG. 3. In this case, in the current doubler type rectifier and smoothing circuit 20 on the secondary side, the synchronous rectifier switch ML1 is turned on, and the synchronous rectifier switch ML2 is turned off.

In the next period #10 in FIG. 4, the arm switches MH2, MH3 and MH1 in the full bridge circuit 10 on the primary side are turned off, and the arm switch MH4 in the full bridge circuit 10 is turned on as with the period #9 in FIG. 3 and FIG. 4. However, in the current doubler type rectifier and smoothing circuit 20 on the secondary side, the synchronous rectifier switch ML1 is turned off and the synchronous rectifier switch ML2 is turned on, different from the period #9 in FIG. 3 and FIG. 4. From this, as with the period #5 in FIG. 5, the operation area is divided into four operation areas by a relation (state) between a current Is flowing in the secondary coil Ls of the transformer TR and a current IL1 flowing in the choke coil L1, even if the ON/OFF states of the switches are the same.

Each area of the period #10 in FIG. 4 may be described as follows using descriptions similar to those of the period #5 in FIG. 5.

1) Period #10-*a* is the area that a current Is flowing in the secondary coil Ls is in the negative area.
2) Period #10-*b* is the area that a direction of the current Is flowing in the secondary coil Ls is changed from the negative direction to the positive direction, and the current Is flowing in the secondary coil Ls becomes identical to the current IL1 flowing in the choke coil L1.
3) Period #10-*c* is the area that the current Is flowing in the secondary coil Ls exceeds the current IL1 flowing in the choke coil L1 and returns to the current IL1 flowing in the choke coil L1.
4) Period #10-*d* is the area that the current Is flowing in the secondary coil Ls finally converges at the current IL1 flowing in the choke coil L1 to be identical to the current IL1.

Here, the current IL1 flowing in the choke coil L1 may be considered as a constant current in a fine period. Therefore, the current IL1 is treated as a constant current.

Hereinafter, the periods #10-*a* to #10-*d* will be explained sequentially.

1) Period #10-*a*

In the period #10-*a*, a current flowing in the body diode DL2 in the period #9 is switched to a current in the synchronous rectifier switch ML2, and a current flowing in the synchronous rectifier switch ML1 in the period #9 is switched to a current in the body diode DL1. Here, a current summing the current Is of the secondary coil Ls and the current IL1 of the choke coil L1 flows in the body diode DL1. Therefore, the terminal voltage V21 of the secondary coil Ls decreases by the amount of forward drop voltage Vd of the body diode DL1.

2) Period #10-b

In the next period #10-b, a direction of the current Is flowing in the secondary coil Ls is changed from the negative direction to positive direction. As a result, the direction of the current Is inverted from the direction in the period #10-a, and the current Is flows from the choke coil L1 to a load (not shown) connected in parallel with the output capacitor Co, and further to the synchronous rectifier switch ML2. Then, with respect to the body diode DL1 where the current IL1 with a constant value was flowing in the choke coil L1 in the period #10-a, if the current Is flowing in the secondary coil Ls is added to the choke coil L1, a current flowing in the body diode DL1 decreases by the amount of increase in the current Is flowing in the secondary coil Ls. In addition, if the current Is flowing in the secondary coil Ls is increased in the negative direction to be identical to the constant value of the current IL1 flowing in the choke coil L1, current flow stops in the body diode DL1. Then, the body diode DL1 becomes non-conductive to be cut-off, and the step enters the next period #10-c.

3) Period #10-c

In the period #10-c, if the current Is flowing in the secondary coil Ls is further increased in the positive direction, the current Is exceeds the constant value of the current IL1 flowing in the choke coil L1. As a result, an amount of current which exceeds the constant current value of the current IL1 flowing in the choke coil L1 of the current Is flowing in the secondary coil Ls flows into a parasitic capacitor Cs1 of the synchronous rectifier switch ML1 as a surplus current, while charging the parasitic capacitor Cs1. Then, the terminal voltage of the synchronous rectifier switch ML1, namely, the terminal voltage V21 of the secondary coil Ls is rapidly increased to around a voltage which is a sum of the output voltage Vo and a voltage between both ends of the choke coil L1. Due to this rapid increase in the voltage, the current Is flowing in the secondary coil Ls is suppressed, thereby the surplus current flowing in the parasitic capacitor Cs1 of the synchronous rectifier switch ML1 decreases. Then, the current Is flowing in the secondary coil Ls gradually returns to the constant value of the current IL1 flowing in the choke coil L1.

4) Period #10-d

In the last period #10-d, the surplus current which was flowing in the parasitic capacitor Cs1 of the synchronous rectifier switch ML1 in the period #10-c finally becomes zero. Therefore, the current Is flowing in the secondary coil Ls converses at the constant value of the current IL1 flowing in the choke coil L1 to be identical to the constant value. Due to a set of these operations, energy of the current doubler type rectifier and smoothing circuit 20 on the secondary side, namely, the energy accumulated in the choke coil L1 flows into the secondary coil Ls of the transformer TR. The energy is transmitted to the primary coil Lp and suppresses a decrease in the current Ip flowing in the primary coil Lp to maintain a negative constant value of the current Ip flowing in the primary coil Lp. The negative constant value of the current Ip of the primary coil Lp works to promote charging (or discharging of parasitic electrostatic capacity Cr1 of the arm switch MH1) of the parasitic electrostatic capacity Cr2 of the arm switch MH2. Then, the terminal voltage V11 of the primary coil Lp increases to the DC voltage VDC in the sine wave shape so that the ZVS can be achieved.

In the period #5 described above, it is important to maintain the current Ip of the primary coil Lp of the transformer TR to be a positive constant value. There may be a case that the operation is different from the forgoing explanation depending on a condition of the load. However, at any rate, the requirement that the energy accumulated in the choke coil L2 is transmitted to the primary coil Lp, and the current Lp of the primary coil Lp becomes a positive constant value is satisfied. Then, the ZVS can be achieved.

It is noted that a time combining the period #4 and the period #5 corresponds to a time of the OFF period (dead band) of the top and bottom arm switches which are required resonant operations for achieving the ZVS of the full bridge circuit 10. If the time of the OFF period exceeds the forgoing shift quantity, it is better to use the shift quantity as the time of the OFF period. The time combining the period #4 and the period #5 is, for example, about 0.5 μsec at 100 kHz.

In this method, a load state is detected, and under a light load, switching timings of the synchronous rectifier switches ML1 and ML2 on the secondary side are set during the OFF state (Off period) of the arm switches MH1 and MH2 of the full bridge circuit 10 on the primary side. Then, the switching timings of the synchronous rectifier switches are shifted from a trailing edge to a leading edge side of the OFF periods of top and bottom arm switches on the lag phase side of the full bridge circuit 10, that is, the switching timing is shifted from a rise timing of an arm switch switching from OFF to ON to a fall timing of an arm switch switching from ON to OFF of the top and bottom arm switches which are required the resonant operations for achieving the ZVS of the full bridge circuit 10. As a result, a current in the circuit on the primary side is increased, and the ZVS can be achieved.

In addition, during the OFF period of the arm switches MH1 and MH2 of the full bridge circuit 10 on the primary side, the switching timings of the synchronous rectifier switches ML1 and ML2 are more shifted from the trailing edge to the leading edge side of the OFF periods of the top and bottom arm switches on the lag phase side of the full bridge circuit 10 as the load becomes lighter, that is, a shift quantity of the switching timing from the rise timing of the arm switch switching from OFF to ON to the fall timing of the arm switch switching from ON to OFF of the top and bottom arm switches on the lag phase side of the full bridge circuit 10 is increased more as the load becomes lighter. As a result, a current in the circuit on the primary side is further increased, and the ZVS can be achieved in a wider load range. Meanwhile, the shift quantity is maximized when the switching timing is shifted from the trailing edge to the leading edge of the OFF period of the top and bottom arm switches on the lag phase side of the full bridge circuit 10.

Figure 12:
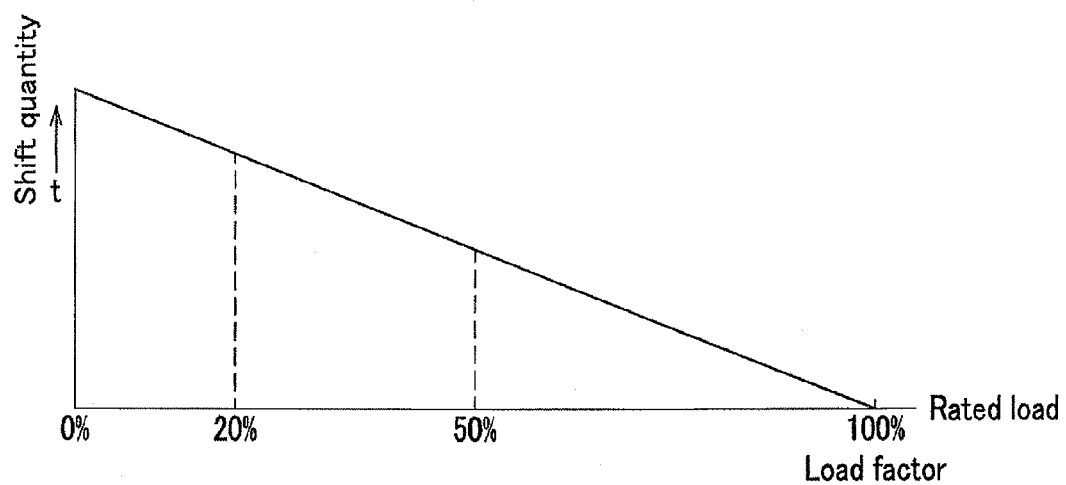
FIG. 12 is a characteristic graph showing a relationship between a load factor against a rated load and a shift quantity of switching timing of a synchronous rectifier switch.

The forgoing relation is briefly shown in FIG. 12. In FIG. 12, the horizontal axis indicates a load factor that is a ratio of a load to a rated load, and the vertical axis indicates a shift quantity (time t) of switching timing of a synchronous rectifier switch from a rise timing of an arm switch switching from OFF to ON to a fall timing of an arm switch switching from ON to OFF of the top and bottom arm switches on the lag phase side of the full bridge circuit 10. It is noted that although the characteristic in FIG. 12 is shown linearly, but the relation is not always linear and the linear line shows a trend of the change. In addition, the shift quantity may be varied continuously in some case, and may be varied step by step by sectioning a load state in other case.

With respect to the operation timings of the switches MH1 to MH4, ML1 and ML2, the timings are generated as follows.

A load current is detected using the current transformer CT and transmitted to the control circuit CONT, and if a load is a rated load (and its vicinity), the timings shown in FIG. 2 are generated, and if the load is a light load other than the rated load (and its vicinity), the timings shown in FIG. 4 are generated by the control circuit CONT. With respect to a shift quantity, which is set according to a load current, of the synchronous rectifier switches ML1 and ML2 on the secondary side, it is unnecessary to determine in detail by the operation, and the shift quantity which maximizes the efficiency against the load can be determined uniquely by the empirical rule. However, regarding a detection method of the load current, a voltage proportional to the load current may be used by using a sense resistor instead of the current transformer CT.

Meanwhile, the switching timings of the synchronous rectifier switches ML1, NL2 are varied by the timing variable means provided in the control circuit CONT.

In addition, switching timings of the synchronous rectifier switches ML1, ML2 on the secondary side corresponding to the period #5 are set based on only information of the load current. However, a current value of the circuit on the primary side also depends on a variation of the DC voltage VDC, it is better to add information of the DC voltage VDC for achieving the ZVS. For this purpose, although not shown, a voltage obtained by dividing the DC voltage VDC may be supplied to the control circuit CONT.

In addition, the operation timings of the switches MH1 to MH4, ML1 and ML2 generated by the control circuit CONT are varied depending on a load state. Then, a calculation for generating the detailed operation timings is required. For this purpose, the calculation may be performed by a digital control, as well as an analog control as a matter of course.

When a DSP (Digital Signal Processor) or the like is used for the digital control, the top and bottom arm switches can be controlled by, for example, a single compare unit, in order to generate a PWM pulse which sets only a dead band time like the arm switches of the full bridge circuit 10 on the primary side. However, generally, when two different timing pulses are used like the synchronous rectifier switches on the secondary side, two compare units are required. In the embodiment, since a complementary pulse with duty 50% is used for driving the two synchronous rectifier switches on the secondary side, only a single compare unit is required.

(Another Embodiment of Control Signal)

Figure 13:
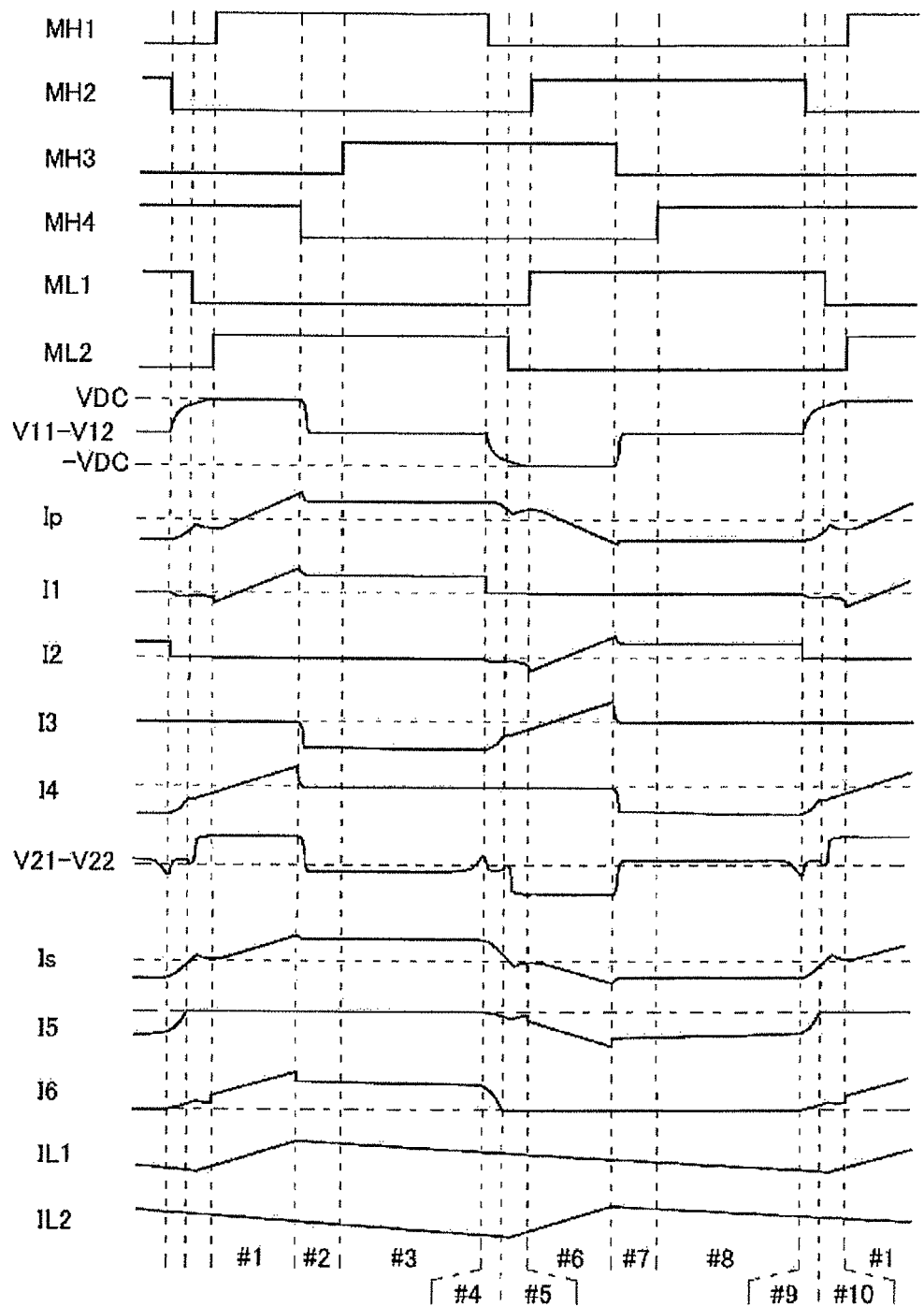
FIG. 13 is another timing chart of operations of respective switches for achieving ZVS (Zero Voltage Switching) when the power-supply unit shown in FIG. 1 is under a light load.

In another embodiment of the control signal, control signals ML1, ML2 in FIG. 13 may be used under a light load instead of the control signals ML1, ML2 in FIG. 4. In this case, a fall timing similar to FIG. 4 is used for the fall timing of a synchronous rectifier switch switching from ON to OFF of the control signals ML1, ML2 in FIG. 13. However, a rise timing of a synchronous rectifier switch switching from OFF to ON is fixed to the tailing edge of the OFF period of the top and bottom arm switches on the lag phase side of the full bridge circuit 10, that is, the switching timing is fixed to the rise timing of an arm switch switching from OFF to ON of the top and bottom arm switches. Namely, in this embodiment, the OFF period is set in respective control signals ML1, ML2 during the OFF periods of the top and bottom arm switches on the lag phase side of the full bridge circuit. Even if the timings are set as described above, in the period #5 in FIG. 10A to FIG. 10D, there is no change of the operation except that a current flowing in the synchronous rectifier switch ML1 flows toward the body diode and the ZVS also can be achieved, accordingly.

In the embodiment, the ON/OFF operations of the synchronous rectifier switches are conducted during the OFF periods of the top and bottom arm switches on the lag phase side of the full bridge circuit. Then, a pulse with duty approximately 50% can be used for driving the synchronous rectifier switches. Accordingly, for example, a failure that the synchronous rectifier switches on the secondary side are operated when the full bridge circuit is activated (period that power on the primary side is transmitted to the secondary side), or a failure that switches of a controlled system can not be correctly operated since a pulse width becomes too narrow, does not occur. As a result, there is no chance to break the respective switching devices through a shortage of the circuit on the secondary side of the transformer.

In addition, in the embodiment, the switches MH1 to MH4, ML1 and ML2 are constituted by MOSFETs. However, IGBT (Insulated Gate Bipolar Transistor), BJT (Bipolar Junction Transistor), or other appropriate transistor may be used for the switches.

In addition, an N-channel type MOSFET was used for the explanation of the switches MH1 to MH4, ML1 and ML2. However, a P-channel type MOSFET, or a combination of the P-channel type MOSFET and the N-channel type MOSFET may be used. In this case, a polarity of a signal for controlling the MOSFET is changed.

As described above, in the embodiment, since the ZVS can be achieved in a wide load range, the efficiency can be improved under a light load, especially in the area of 20 to 50% of the rated load. In addition, the efficiency improvement under a light load can be performed by changing only the operation timing of the two synchronous rectifier switches on the secondary side without adding any circuit component to a power block of the power-supply unit. Furthermore, since no circuit component is added to the power block for implementing light load measures, the cost of the power-supply unit does not rise.

(Second Embodiment)

Figure 14:
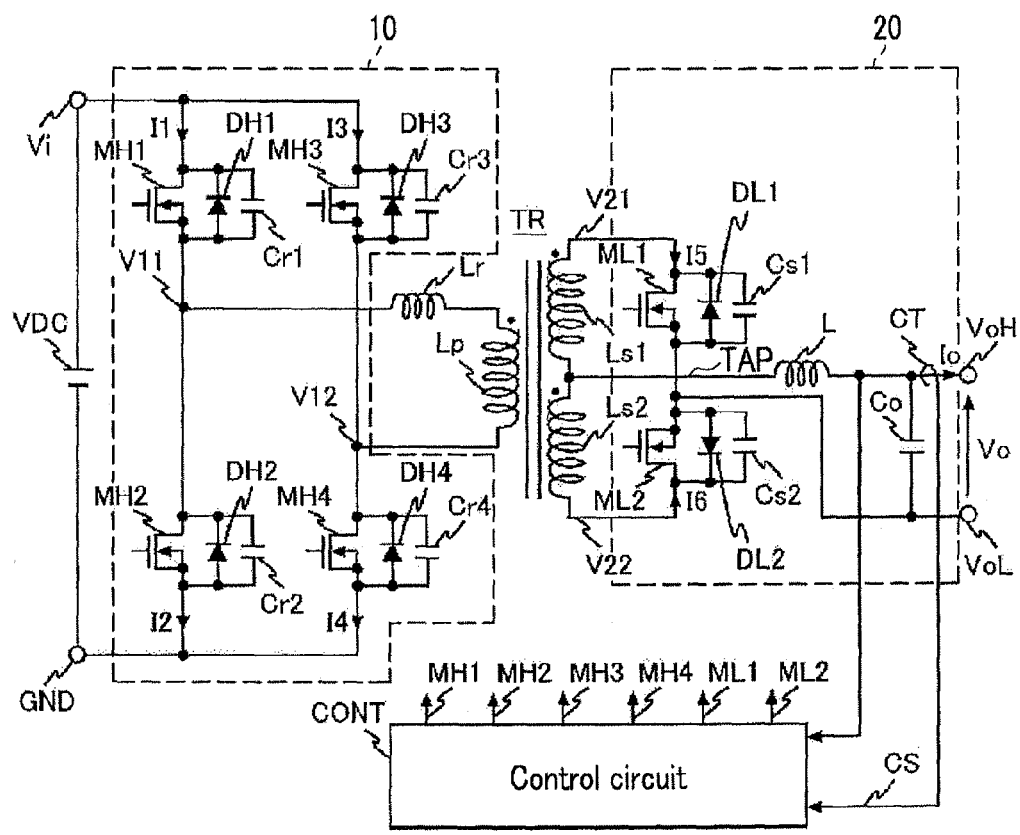
FIG. 14 is a circuit diagram showing a configuration of a power-supply unit according to a second embodiment of the present invention.

A second embodiment of the power-supply unit of the present invention is shown in FIG. 14.

In FIG. 14, a reference TR is a transformer, and a reference 10 shown with a dotted line is a full bridge circuit which AC-drives a primary coil Lp of the transformer TR. A reference 20 shown with a dotted line is a current doubler type rectifier and smoothing circuit which converts AC voltage induced in a secondary coil Ls of the transformer TR to DC voltage through synchronous conversion. A reference CONT is a control circuit which controls operation timings of arm switches MH1 to MH4 constituting the full bridge circuit 10 and consisting of MOSFETs and operation timings of synchronous rectifier switches ML1, ML2 consisting of MOSFETs in the current doubler type rectifier and smoothing circuit 20.

Here, basic configurations of the full bridge circuit 10 and the control circuit CONT are the same with those in FIG. 1. On the other hand, configurations of the transformer TR and the current doubler type rectifier and smoothing circuit 20 are different from those in FIG. 1.

In the transformer TR, the secondary coil is changed to coils Ls1, Ls2 with a center-tap TAP, thereby the current doubler type rectifier and smoothing circuit 20 is also changed.

In the current doubler type rectifier and smoothing circuit 20, respective ends of the secondary coil are connected to the synchronous rectifier switch ML1 and the synchronous rectifier switch ML2 in series, and the center-tap TAP of the secondary coil is connected to one end of an output capacitor Co via a choke coil L. In addition, the other end of the output capacitor Co is connected to a midpoint of the synchronous rectifier switch ML1 and the synchronous rectifier switch ML2.

In the embodiment, a load state and a DC voltage state on the primary side are also detected, and if the load is a rated load (and its vicinity), operation timings of the switches MH1 to MH4, ML1 and ML2 shown in FIG. 2 are generated, and if the load is a light load other than the rated load (and its vicinity), the operation timings shown in FIG. 4 are generated by the control circuit CONT. As a result, the ZVS can also be achieved in a wide load range as with the configuration in FIG. 1, and the efficiency under a light load can be improved, accordingly.

As described above, since the ZVS can also be achieved in a wide load range in this embodiment, the efficiency can be improved under a light load, especially in an area of 20 to 50% of the rated load. In addition, the efficiency improvement under a light load can be performed by changing only the operation timings of the two synchronous rectifier switches on the secondary side without adding any circuit component to a power block of the power-supply unit. Furthermore, since no circuit component is added to the power block for implementing light load measures, the cost of the power-supply unit does not rise.

(Third Embodiment)

Figure 15:
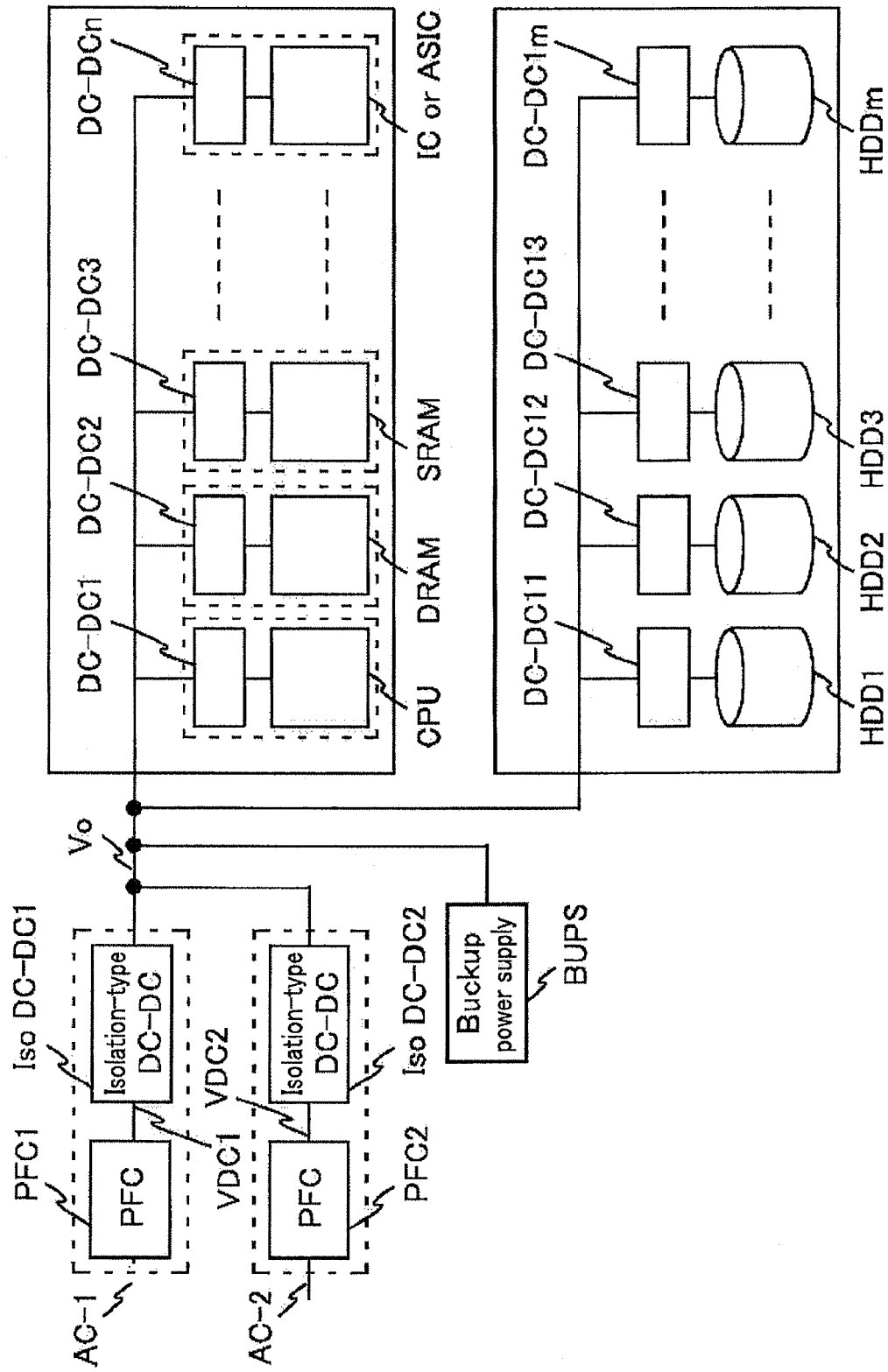
FIG. 15 is a function block diagram showing a configuration of a power-supply unit provided in a hard disk drive according to the present invention.

A hard-disk drive according to an embodiment of the present invention is shown in FIG. 15.

FIG. 15 is an example of a HDD apparatus (Hard Disk Drive, hereinafter, referred to as HDD apparatus) to which the present invention is applied. The HDD apparatus is provided with a power source system of a parallel redundancy structure. When AC voltage is received, the power source system outputs an output voltage Vo through PFC (Power Factor Correction) circuits PFC1, PFC2 and the isolation type DC-DC converters (Iso DC-DC1, Iso DC-DC2) that are described in the first embodiment or the second embodiment. The output voltage Vo is given power outage measures by connecting a buckup power supply BUPS which mounts a battery.

In addition, the output voltage Vo supplies power to the HDD apparatuses (HDD1 to HDDm) through non-isolation type DC-DC converters (DC-DC11 to DC-DC1m). In addition, the output voltage Vo supplies power to a processor CPU (Central Processing Unit) managing a control for storing data in the HDD apparatus through non-isolation type DC-DC converters (DC-DC1 to DC-DCn) and to a board consisting of high-speed large capacity memories, for example, DRAM (Dynamic Random Access Memory), SRAM (Static Random Access Memory) and the like, with different and appropriate voltages for respective targets.

As described in the third embodiment, according to a power source system and an apparatus using the power-supply unit described in the first embodiment and the second embodiment, the ZVS can be achieved in a wide load range. As a result, the power source system and the apparatus which can improve the efficiency in response to various loads can be obtained.

[Industrial Applicability]

In the control method of the present invention, a full bridge circuit on the primary side and a rectifier and smoothing circuit using a synchronous rectifier switch on the secondary side are applied to an isolation-type DC-DC converter. Other than this, the control method of the present invention may be applied to an isolation-type DC-DC converter which utilizes resonant operation.

Although not shown, the power-supply unit according to the first embodiment and the second embodiment can be applied to, for example, power sources of various kinds of industrial application equipment, power sources of information and communication equipment, and general-purpose DC-DC converters.

In the present invention, since a dielectric isolation type semiconductor device having a MOSFET structure is used, the present invention is effective in the fields which require a relatively high response speed, while using a high breakdown voltage device element which can drive a high voltage. In addition, the present invention whose current performance and breakdown voltage are further improved than before may be widely adopted in the forgoing fields.

What is claimed is:

1. A power-supply unit, comprising:
a transformer;
a full bridge circuit consisting of four arm switches provided on a primary side of said transformer;
a rectifier and smoothing circuit including two synchronous rectifier switches provided on a secondary side of said transformer, at least one choke coil, and a capacitor;
an output terminal provided in said rectifier and smoothing circuit;
a control circuit controlling ON/OFF of said four arm switches of said full bridge circuit and said two synchronous rectifier switches of said rectifier and smoothing circuit;
a resonant inductor consisting of a leakage inductor component of said transformer and a parasitic inductor component of wirings on said primary side of said transformer; and
a resonant capacitor consisting of a parasitic capacitor component of said arm switches of said full bridge circuit,
wherein said control circuit comprises timing variable means which varies switching timings of said two synchronous rectifier switches of said rectifier and smoothing circuit based on an output current flowing in said output terminal provided in said rectifier and smoothing circuit, and
said switching timings of said two synchronous rectifier switches are shifted by said timing variable means from a trailing edge to a leading edge of OFF periods of top and bottom arm switches on a lag phase side of said four arm switches of said full bridge circuit.

2. The power-supply unit according to claim 1,
wherein said timing variable means varies said switching timings of said two synchronous rectifier switches of said rectifier and smoothing circuit, so that a resonant peak voltage required for achieving a zero volt switching which is determined by said output current, said resonant inductor, and said resonant capacitor can be obtained, and that an amount of current flowing in said full bridge circuit which is required for achieving said zero volt switching can be obtained, by returning energy accumulated in the at least one choke coil of said rectifier and smoothing circuit to said full bridge circuit through said transformer.

3. The power-supply unit according to claim 1,
wherein a complementary pulse with duty 50% is used for said two synchronous rectifier switches.

4. The power-supply unit according to claim 1,
wherein said control circuit controls said ON/OFF of said switching timings of said two synchronous rectifier switches of said rectifier and smoothing circuit using said timing variable means so that an amount of increase in current flowing in said full bridge circuit increases as a load becomes lighter.

5. The power-supply unit according to claim 4,
wherein shift quantities of said switching timings of said two synchronous rectifier switches are increased more as a load becomes lighter from a trailing edge to a leading edge side of OFF periods of top and bottom arm switches on a lag phase side of said four arm switches of said full bridge circuit.

6. The power-supply unit according to claim 1, wherein information of a DC input voltage variation on said primary side is input to said control circuit in addition to information of a load state.

7. The power-supply unit according to claim 1, wherein said timing variable means sets a period that both said two synchronous rectifier switches are turned off during OFF periods of top and bottom arm switches on a lag phase side of said four arm switches of said full bridge circuit.

8. The power-supply unit according to claim 7, wherein said period that both said two synchronous rectifier switches are turned off is characterized in that ON periods of said two synchronous rectifier switches are shortened to widen OFF periods, while keeping a rise timing of an arm switch switching from OFF to ON of said top and bottom arm switches on a lag phase side of said full bridge circuit and a rise timing of said synchronous rectifier switch switching from OFF to ON of said two synchronous rectifier switches.

9. The power-supply unit according to claim 7, wherein said period that both said two synchronous rectifier switches are turned off is made wider as a load becomes lighter.

10. The power-supply unit according to claim 1, wherein said switching timings of said four arm switches of said full bridge circuit and said two synchronous rectifier switches are generated by a digital control.

11. The power-supply unit according to claim 1, wherein said rectifier and smoothing circuit has a current doubler type circuit configuration.

12. The power-supply unit according to claim 1, wherein a secondary coil of said transformer of said rectifier and smoothing circuit is provided with a center tap.

13. The power-supply unit according to claim 1, wherein another resonant inductor is provided between said transformer and said full bridge circuit.

14. The power-supply unit according to claim 1, wherein said control circuit controls said ON/OFF of said switching timings of said two synchronous rectifier switches of said rectifier and smoothing circuit using said timing variable means so that energy returned to said full bridge circuit under a light load is supplied from a choke coil connected to a synchronous rectifier switch switching from ON to OFF of said two synchronous rectifier switches of said rectifier and smoothing circuit during OFF periods of top and bottom arm switches on a lag phase side of said four arm switches of said full bridge circuit.

15. A hard disk drive comprising a magnetic storage disk, a magnetic head, a magnetic-disk rotating drive, a magnetic-head drive, a magnetic-head position controller, an input/output signal controller, and a power-supply unit for supplying power,
wherein said power-supply unit is an isolation-type DC-DC converter, which outputs a DC voltage by receiving an output voltage of a PFC circuit, in an AC-DC converter which outputs a DC voltage by receiving an AC voltage, said power-supply unit comprising:
a transformer;
a full bridge circuit consisting of four arm switches provided on a primary side of said transformer;
a rectifier and smoothing circuit including two synchronous rectifier switches provided on a secondary side of said transformer, at least one choke coil, and a capacitor;
an output terminal provided in said rectifier and smoothing circuit;
a control circuit controlling ON/OFF of said four arm switches of said full bridge circuit and said two synchronous rectifier switches of said rectifier and smoothing circuit;
a resonant inductor consisting of a leakage inductor component of said transformer and a parasitic inductor component of wirings on said primary side of said transformer; and
a resonant capacitor consisting of a parasitic capacitor component of said arm switches of said full bridge circuit,
wherein said control circuit comprises timing variable means which varies switching timings of said two synchronous rectifier switches of said rectifier and smoothing circuit based on an output current flowing in said output terminal provided in said rectifier and smoothing circuit; and
said switching timings of said two synchronous rectifier switches are shifted by said timing variable means from a trailing edge to a leading edge of OFF periods of top and bottom arm switches on a lag phase side of said four arm switches of said full bridge circuit.

16. A switching method of a power-supply unit, comprising steps of:
having a transformer;
having a full bridge circuit consisting of four arm switches provided on a primary side of said transformer;
having a rectifier and smoothing circuit including two synchronous rectifier switches provided on a secondary side of said transformer, at least one choke coil, and a capacitor;
having an output terminal provided in said rectifier and smoothing circuit;
having a control circuit controlling ON/OFF of said four arm switches of said full bridge circuit and said two synchronous rectifier switches of said rectifier and smoothing circuit;
having a resonant inductor consisting of a leakage inductor component of said transformer and a parasitic inductor component of wirings on said primary side of said transformer; and
having a resonant capacitor consisting of a parasitic capacitor component of said arm switches of said full bridge circuit,
wherein said control circuit comprises timing variable means which varies switching timings of said two synchronous rectifier switches of said rectifier and smoothing circuit based on an output current flowing in said output terminal provided in said rectifier and smoothing circuit; and
said switching timings of said two synchronous rectifier switches are shifted by said timing variable means from a trailing edge to a leading edge of OFF periods of top and bottom arm switches on a lag phase side of said four arm switches of said full bridge circuit.

* * * * *